(12) United States Patent  (10) Patent No.: US 8,347,511 B2
Young et al.  (45) Date of Patent: Jan. 8, 2013

(54) CUTTER ASSEMBLY FOR CONCAVE TAPERED FOOD PRODUCT

(75) Inventors: Harlow Young, Kennewick, WA (US); John Julian, Richland, WA (US)

(73) Assignee: ConAgra Foods Lamb Weston, Inc., Omaha, NE (US)

( * ) Notice: Subject to any disclaimer, the term of this patent is extended or adjusted under 35 U.S.C. 154(b) by 13 days.

(21) Appl. No.: 13/151,789

(22) Filed: Jun. 2, 2011

(65) Prior Publication Data

US 2011/0239469 A1  Oct. 6, 2011

Related U.S. Application Data

(60) Division of application No. 11/725,162, filed on Mar. 16, 2007, now abandoned, which is a continuation-in-part of application No. 11/378,924, filed on Mar. 17, 2006, now Pat. No. 7,513,450, and a continuation-in-part of application No. 29/246,432, filed on Apr. 11, 2006, now Pat. No. Des. 581,627, and a continuation-in-part of application No. 29/246,433, filed on Apr. 11, 2006, now Pat. No. Des. 577,176.

(51) Int. Cl.
*A47J 43/00* (2006.01)
(52) U.S. Cl. .............. 30/303; 30/356; 30/329; 30/355; 83/13
(58) Field of Classification Search .............. 30/303, 30/356, 329, 355; 83/13
See application file for complete search history.

(56) References Cited

U.S. PATENT DOCUMENTS

| 48,316 A | 6/1865 | Sloan | 241/258 |
|---|---|---|---|
| D40,268 S | 9/1909 | Marvin | D1/127 |
| 978,482 A | 12/1910 | Petri | |
| 1,087,335 A | 2/1914 | Swartz | 426/144 |
| 1,371,158 A * | 3/1921 | Gilbert | 30/302 |
| 1,512,484 A | 10/1924 | Porter | 241/277 |
| 2,538,430 A * | 1/1951 | Shadduck | 83/622 |
| 2,612,453 A | 9/1952 | Stahmer | 426/143 |
| 2,769,714 A | 11/1956 | Stahmer | 426/144 |

(Continued)

FOREIGN PATENT DOCUMENTS

CN  ZL200780017806  11/2011

(Continued)

OTHER PUBLICATIONS

Written Opinion dated Sep. 18, 2008 in Application No. PCT/US2007/006717.

(Continued)

*Primary Examiner* — Anthony Weier
(74) *Attorney, Agent, or Firm* — Advent; Ryan T. Grace

(57) ABSTRACT

A concave tapered food product includes a cross section and a second end having a shape defined by a generally concave arc and a generally convex arc. The concave tapered food product has a first side and a second side shaped by a longitudinal cut along the foodstuff. A cutter assembly for cutting a foodstuff to form the concave tapered food product includes a housing member. The cutter assembly also includes a curvilinear blade including a cutting edge for cutting the foodstuff, the cutting edge defining an arc along a first portion of the curvilinear blade and a foot positioned at an end of the curvilinear blade for supporting the curvilinear blade. The foot is configured for being received and secured in the housing member. The housing member is configured for at least partially enclosing the curvilinear blade.

14 Claims, 37 Drawing Sheets

U.S. PATENT DOCUMENTS

| | | | | |
|---|---|---|---|---|
| 2,769,715 | A | | 11/1956 | Stahmer .................... 426/144 |
| 2,794,628 | A | | 6/1957 | Fessenden ................. 416/234 |
| 2,968,261 | A | * | 1/1961 | Tonkin ....................... 425/169 |
| 2,977,901 | A | | 4/1961 | Deary, Sr. et al. .......... 425/385 |
| 3,109,470 | A | | 11/1963 | Urschel et al. |
| 3,132,423 | A | | 5/1964 | De Lano ....................... 30/114 |
| 3,451,822 | A | | 6/1969 | Fast et al. .................... 426/550 |
| 3,498,798 | A | | 3/1970 | Hawley et al. .............. 426/124 |
| D228,827 | S | | 10/1973 | Cammelot et al. .......... D1/199 |
| 3,852,485 | A | | 12/1974 | Beall ........................... 426/106 |
| D239,215 | S | | 3/1976 | Miller .......................... D1/120 |
| D246,941 | S | | 1/1978 | Kalt .............................. D1/129 |
| 4,235,941 | A | | 11/1980 | Coats ........................... 426/646 |
| 4,511,586 | A | | 4/1985 | Fitzwater et al. ............ 426/144 |
| D285,740 | S | | 9/1986 | Watanabe ..................... D1/122 |
| 4,650,684 | A | | 3/1987 | Penrose ........................ 426/144 |
| 4,855,151 | A | | 8/1989 | Fielding ....................... 426/144 |
| 4,889,737 | A | | 12/1989 | Willard et al. ............... 426/550 |
| 4,937,084 | A | | 6/1990 | Julian ........................... 426/144 |
| 4,973,481 | A | | 11/1990 | Dayley et al. ................ 426/144 |
| 5,095,875 | A | | 3/1992 | Morris et al. ................... 83/856 |
| 5,188,859 | A | | 2/1993 | Lodge et al. ................. 426/560 |
| D340,121 | S | | 10/1993 | Russell ......................... D1/199 |
| 5,419,903 | A | | 5/1995 | Evans et al. ................. 426/144 |
| 5,549,918 | A | | 8/1996 | Hartman et al. ............. 426/291 |
| D380,885 | S | | 7/1997 | Goll .............................. D1/125 |
| 5,662,033 | A | * | 9/1997 | Yawman ......................... 99/538 |
| D396,536 | S | | 8/1998 | Goll et al. .................... D1/125 |
| 6,557,260 | B1 | | 5/2003 | Morris ............................ 30/114 |
| D488,282 | S | | 4/2004 | Barry et al. .................. D1/123 |
| D493,271 | S | | 7/2004 | Bhaskar et al. .............. D1/123 |
| D495,852 | S | | 9/2004 | Barber .......................... D1/125 |
| 6,799,495 | B2 | | 10/2004 | Jensen |
| D512,809 | S | | 12/2005 | Baumgartner ................ D1/121 |
| 7,096,771 | B2 | * | 8/2006 | Mendenhall .................... 83/857 |
| 7,513,450 | B2 | | 4/2009 | Young et al. .............. 241/292.1 |
| 2003/0232116 | A1 | | 12/2003 | Fein et al. .................... 426/523 |
| 2004/0018276 | A1 | | 1/2004 | Hsieh .............................. 426/94 |
| 2005/0089604 | A1 | | 4/2005 | Pastore ......................... 426/101 |
| 2005/0118304 | A1 | | 6/2005 | Rasmussen .................... 426/94 |
| 2005/0202125 | A1 | | 9/2005 | Bosch et al. ................... 426/94 |
| 2006/0040020 | A1 | | 2/2006 | Maric .......................... 426/104 |

FOREIGN PATENT DOCUMENTS

| | | |
|---|---|---|
| EP | 0 873 828 B1 | 8/2003 |
| JP | 49-6167 | 1/1974 |
| JP | 60-104698 | 6/1985 |
| JP | 61-162152 | 7/1986 |
| JP | 2001-315092 | 11/2001 |
| NZ | 571320 | 11/2011 |
| WO | WO 2007/109181 A2 | 9/2007 |
| WO | WO 2007/109181 A3 | 9/2007 |

OTHER PUBLICATIONS

International Search Report dated Sep. 18, 2008 in Application PCT/US2007/006717.
Chinese First Office Action dated Dec. 18, 2009 cited in Application No. PCT/US2007/00617.
U.S. Official Action mailed Jan. 22, 2010, in U.S. Appl. No. 11/725,162.
New Zealand Examination Report dated Mar. 1, 2010, cited in Application No. PCT/US2007/00617.
New Zealand Examination Report dated May 26, 2010, cited in Application No. PCT/US2007/00617.
U.S. Official Action mailed Jul. 20, 2010, in U.S. Appl. No. 11/725,162.
Chinese Second Office Action dated Jul. 30, 2010, cited in Application No. PCT/US2007/00617.
U.S. Official Action mailed Nov. 12, 2010, in U.S. Appl. No. 11/725,162.
Chinese Third Office Action dated Dec. 14, 2010, cited in Application No. PCT/US2007/00617.
U.S. Official Action mailed Mar. 3, 2011, in U.S. Appl. No. 11/725,162.
Chinese Fourth Office Action dated Mar. 16, 2011, cited in Application No. PCT/US2007/00617.
New Zealand Examination Report dated May 12, 2011, cited in Application No. PCT/US2007/00617.
New Zealand Notice of Acceptance dated Jul. 8, 2011, cited in Application No. PCT/US2007/00617.
Chinese Notification of Grant dated Jul. 21, 2011, cited in Application No. PCT/US2007/00617.
Inland Valley, Seasoned and Coasted [online], Jan. 12, 2002 [retrieved on Jan. 29, 2009]. Retrieved from the Internet ,URL:http//web.archive.org/web/20020112111525/http://www.lambweston.com/liv/products/season.shtml>.
The Good Housekeeping Illustrated Cookbook: Revised and Expanded Edition, by Hearst Books, NY, © 1989, p. 291.
D1 Box AA1: Women's Day, Jan. 1952, p. 70.
Gourmet: The Magazine of Good Living, vol. 62, Jan. 2002, p. 85.
Big Y World Class Market [online], Mar. 4, 2006 {retrieved on Jan. 29, 2008]. Retrieved from the Internet <URL:http://web.archieve.org/web20060113155412/http://www.bigy.com/content/dary/seas/wntr/dary_3aday_superbowl.php>.
Heat and Control [online], Mar. 4, 2006 [retrieved on Jan. 29, 2008]. Retrieved from the Internet <URL:http://web.archive.org/web/20060304171152/http://www.heatandcontrol.com/images/user_ffs.jpg>.
Australian First Office Action dated May 16, 2012, Application Serial No. 2007227463.
Japanese Office Action dated Apr. 10, 2012, Application Serial No. 2009-501477.

* cited by examiner

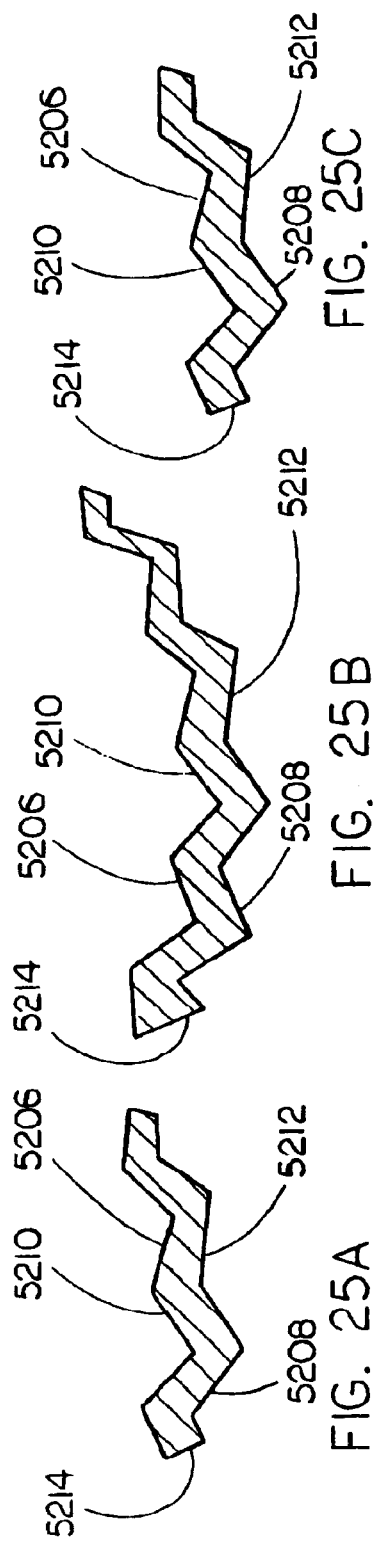
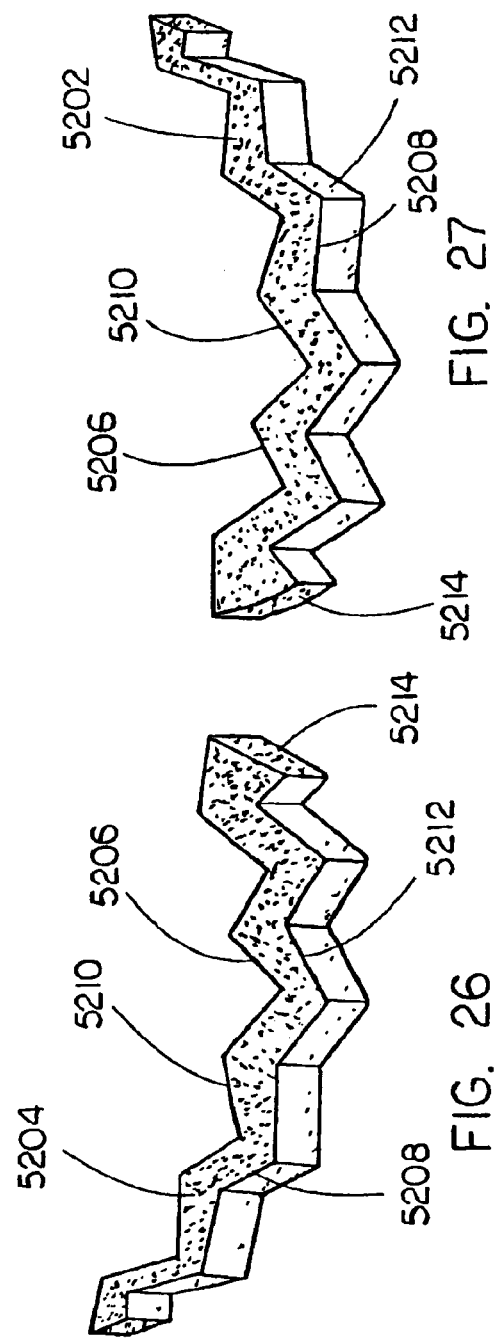
FIG. 25A  FIG. 25B  FIG. 25C  FIG. 26  FIG. 27

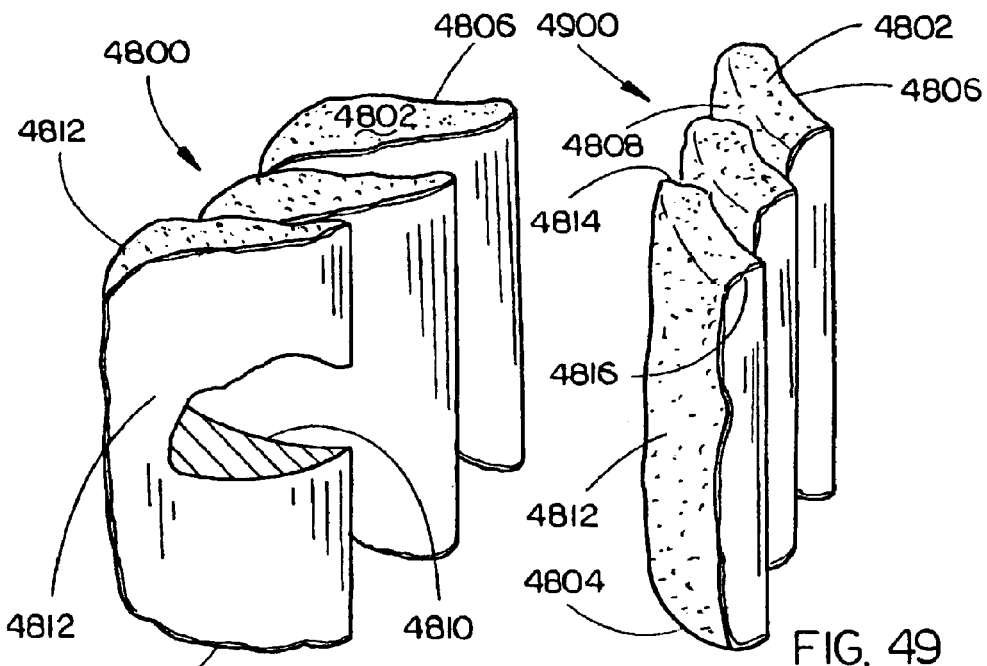
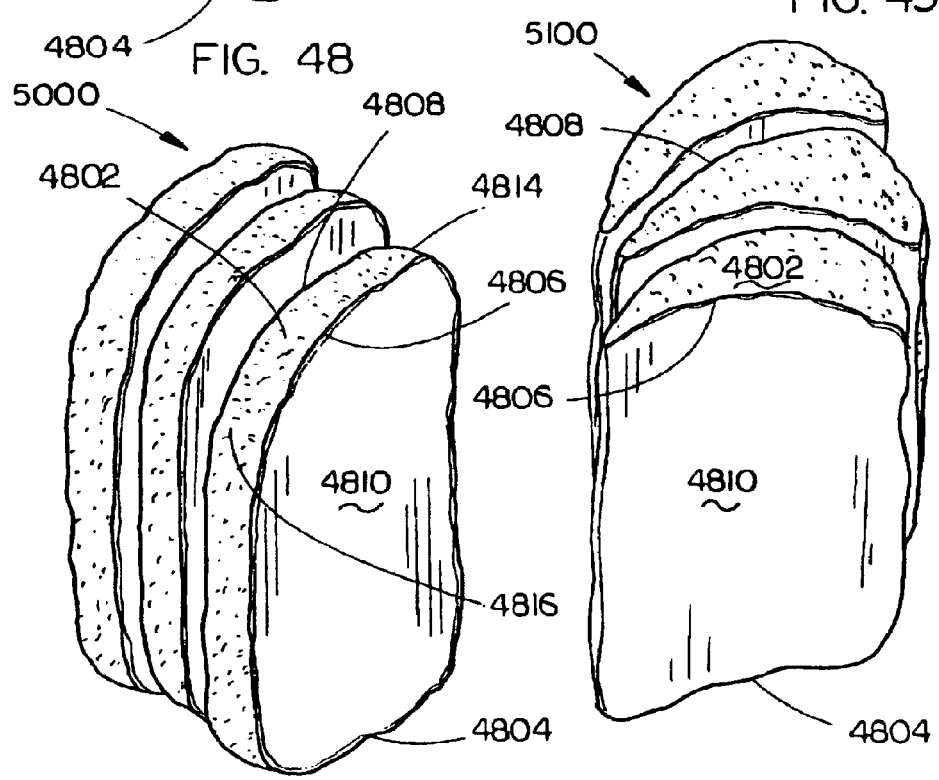
FIG. 48
FIG. 49
FIG. 50
FIG. 51

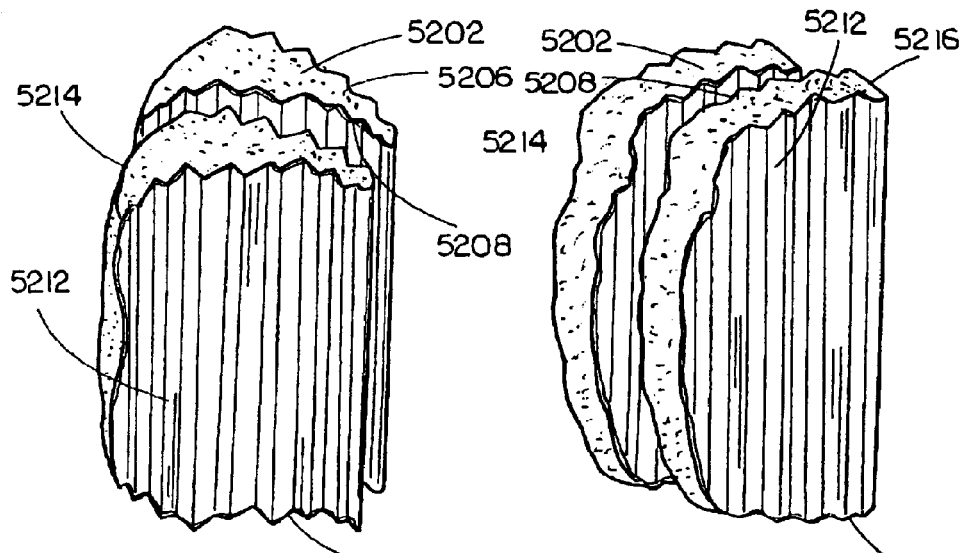
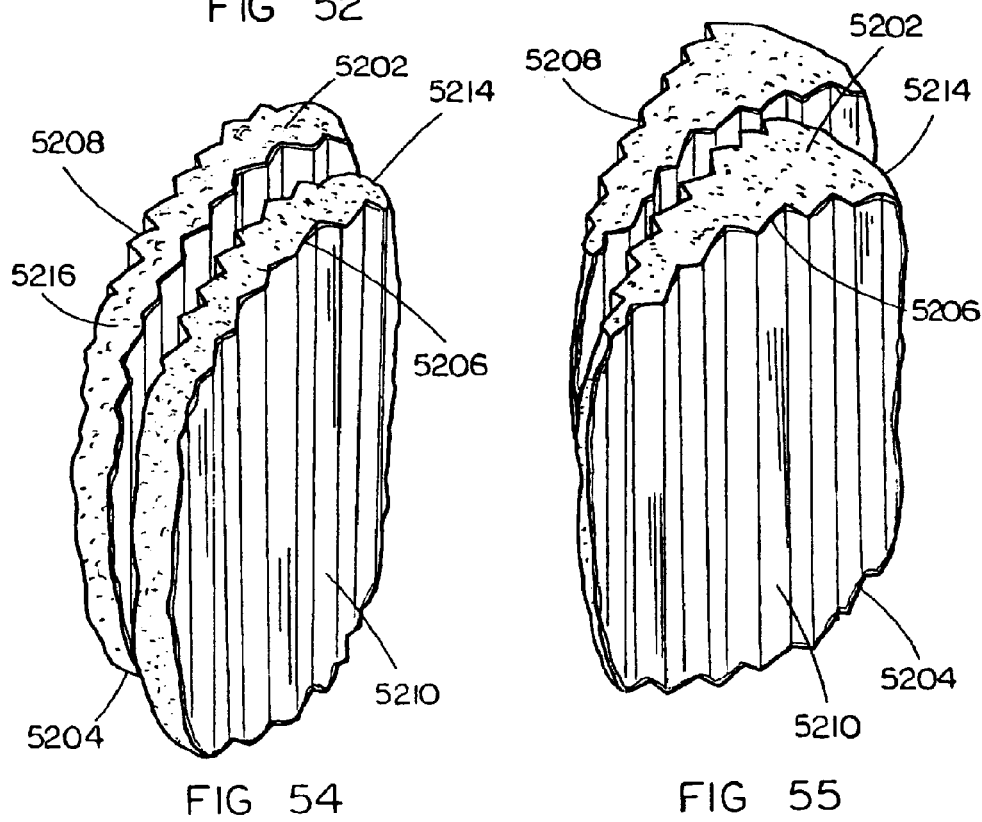

CUTTER ASSEMBLY FOR CONCAVE TAPERED FOOD PRODUCT

CROSS-REFERENCE TO RELATED APPLICATIONS

The present application is a divisional of U.S. patent application Ser. No. 11/725,162 filed Mar. 16, 2007 now abandoned, which is a continuation-in-part of U.S. patent application Ser. No. 11/378,924 filed Mar. 17, 2006 (now U.S. Pat. No. 7,513,450 issued Apr. 7, 2009), and is also a continuation-in-part of U.S. Design application Ser. No. 29/246,432 filed Apr. 11, 2006 (now U.S. Pat. No. D581,627), and U.S. Design application Ser. No. 29/246,433 filed Apr. 11, 2006 (now U.S. Pat. No. D577,176). Said U.S. patent application Ser. Nos. 11,725,162 and 11/378,924, and U.S. Design application Ser. Nos. 29/246,432 and 29/246,433 are hereby incorporated by reference in their entirety.

FIELD OF THE INVENTION

The present invention generally relates to the field of food products, and more particularly to a method and apparatus for producing a concave tapered food product, such as a concave tapered potato.

BACKGROUND OF THE INVENTION

An increasing number of food products are processed before arriving on a consumer's plate. A variety of fruits and vegetables, for example, are cut or shaped and then frozen or otherwise preserved for later use. In order to meet the demand for processed food products and efficiently produce large quantities of such products, the food industry utilizes various equipment for rapidly processing large amounts of foodstuff. One type of equipment for cutting and shaping large quantities of foodstuff includes a stationary array of cutting knives where the food product is propelled through the knife array. For example, the food product may be propelled through the knife array by a hydraulic stream. Mechanical methods may be employed to propel a foodstuff through a knife array, for example a belt may be used to propel foodstuff, in another example a plunger may be used to force a knife array through a foodstuff. A system may be developed to propel foodstuff that utilizes gravity, for example a foodstuff may be dropped from a tower towards a knife array. A pneumatic system may be utilized to propel foodstuff towards a knife array, in one example compressed air may propel foodstuff to a knife array, for example by a belt. Food products pneumatically, or by a hydraulic plunger.

One specific hydraulic food cutter has a receiving tank filled with a hydraulic carrier fluid, typically water. Foodstuff is placed in the tank and suspended in the carrier fluid. The suspended food product is pumped from the tank into a segment of tube. The tube aligns the suspended food product with the cutter blade assembly, which includes a number of knife blades mounted parallel to one another. If the food product is to be cut into slices, only a single array need be utilized; however, if the food product is to be cut into elongated, slender pieces, such as French fries or wedges, two such arrays are utilized with the knives in one array extending generally perpendicular to the knives in the other array.

Foodstuffs that are processed to include planar surfaces lack both the appearance of a natural shape, as well as the functional ability to retain various garnishes and toppings. Many consumers desire products which have the appearance of being a naturally shaped product while including functional characteristics such as the ability to easily retain a quantity of seasonings, toppings, garnishes, and the like.

Consequently, it would be desirable to provide a food product cut from a foodstuff, the food product including more naturally shaped surfaces and the ability to hold and retain various toppings. Furthermore, it would be desirable to provide an apparatus for cutting a foodstuff into a shape having such characteristics.

SUMMARY OF THE INVENTION

Accordingly, the present invention is directed to a concave tapered food product, a method, and an apparatus for producing such a product. In one embodiment, a curvilinear blade for cutting a foodstuff for forming a concave tapered food product includes a cutting edge for cutting the foodstuff and an attachment means at one end of the curvilinear blade for supporting the curvilinear blade. The cutting edge is defined by an arc along a first portion of the curvilinear blade. The foot is configured for being received and secured in a cutter assembly for forming the concave tapered food product.

Another embodiment of the present invention includes a cutter assembly for cutting a foodstuff to form a concave tapered food product. The cutter assembly includes a housing member, a curvilinear blade, including a cutting edge for cutting the foodstuff, and an attachment means positioned at one end of the curvilinear blade for support. The cutting edge may be defined by an arc along a first portion of the curvilinear blade. The attachment means may be configured for being received and secured in the housing member and the housing member is for at least partially enclosing the curvilinear blade.

Further disclosed is a method for cutting a foodstuff into a concave tapered food product utilizing a curvilinear blade, including a cutting edge defining an arc for cutting the foodstuff. The method includes securing the curvilinear blade to a housing member, offering the foodstuff to the curvilinear blade through the aperture, and presenting the foodstuff to the curvilinear blade at a speed effective for passing the foodstuff through the curvilinear blade to form the concave tapered food product. The housing member may be configured for at least partially enclosing the curvilinear blade. The housing member may be defined by an aperture sized for the foodstuff.

A further embodiment discloses a food product shaped from a foodstuff including a cross section having a shape defined by a first edge, including a generally concave arc having a first radius, and a second edge including a generally convex arc having a second radius; a second end having substantially the same shape as the cross section; a first side defined by the first edge; and a second side defined by the second edge. The first side and the second side are shaped by a longitudinal cut along the foodstuff.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 25A is a cross-sectional end view of the concave tapered food product with ridges illustrated in FIG. 22;

FIG. 25B is another cross-sectional end view of the concave tapered food product with ridges illustrated in FIG. 22;

FIG. 25C is a further cross-sectional end view of the concave tapered food product with ridges illustrated in FIG. 22;

FIG. 26 is a left side view of the concave tapered food product with ridges illustrated in FIG. 20;

FIG. 27 is a right side view of the concave tapered food product with ridges illustrated in FIG. 20;

FIG. 48 is an isometric view illustrating a concave tapered food product having first and second ends, and first and second sides in accordance with an exemplary embodiment of the present invention, wherein the first and second ends have a shape defined by a first edge including a generally concave arc having a first radius, and a second edge including a generally convex arc having a second radius, and wherein the shape of the first and second ends is further defined by a third edge;

FIG. 49 is an isometric view illustrating a concave tapered food product having first and second ends, and first and second sides in accordance with an exemplary embodiment of the present invention, wherein the first and second ends have a shape defined by a first edge including a generally concave arc having a first radius, and a second edge including a generally convex arc having a second radius, and wherein the shape of the first and second ends is further defined by a third edge and a fourth edge;

FIG. 50 is an isometric view illustrating a concave tapered food product having first and second ends, and first and second sides in accordance with another exemplary embodiment of the present invention, wherein the first and second ends have a shape defined by a first edge including a generally concave arc having a first radius, and a second edge including a generally convex arc having a second radius, and wherein the shape of the first and second ends is further defined by a third edge and a fourth edge;

FIG. 51 is an isometric view illustrating a concave tapered food product having first and second ends, and first and second sides in accordance with a further exemplary embodiment of the present invention, wherein the first and second ends have a shape defined by a first edge including a generally concave arc having a first radius, and a second edge including a generally convex arc having a second radius, and wherein the shape of the first and second ends is further defined by a third edge;

FIG. 52 is an isometric view illustrating a concave tapered food product having first and second ends, and first and second sides in accordance with an exemplary embodiment of the present invention, wherein the first and second ends have a shape defined by a first edge including a generally concave arc with ridges having a first radius, and a second edge including a generally convex arc with ridges having a second radius, and wherein the shape of the first and second ends is further defined by a third edge;

FIG. 53 is an isometric view illustrating a concave tapered food product having first and second ends, and first and second sides in accordance with an exemplary embodiment of the present invention, wherein the first and second ends have a shape defined by a first edge including a generally concave arc with ridges having a first radius, and a second edge including a generally convex arc with ridges having a second radius, and wherein the shape of the first and second ends is further defined by a third edge and a fourth edge;

FIG. 54 is an isometric view illustrating a concave tapered food product having first and second ends, and first and second sides in accordance with another exemplary embodiment of the present invention, wherein the first and second ends have a shape defined by a first edge including a generally concave arc with ridges having a first radius, and a second edge including a generally convex arc with ridges having a second radius, and wherein the shape of the first and second ends is further defined by a third edge and a fourth edge;

FIG. 55 is an isometric view illustrating a concave tapered food product having first and second ends, and first and second sides in accordance with a further exemplary embodiment of the present invention, wherein the first and second ends have a shape defined by a first edge including a generally concave arc with ridges having a first radius, and a second edge including a generally convex arc with ridges having a second radius, and wherein the shape of the first and second ends is further defined by a third edge;

DETAILED DESCRIPTION OF THE INVENTION

Reference will now be made in detail to the presently preferred embodiments of the invention, examples of which are illustrated in the accompanying drawings, FIGS. 1 through 62.

The present invention relates to a cutter assembly, including a curvilinear blade, for producing a concave tapered food product, such as a unique potato product. In particular, the cutter assembly produces a food product, which has a concave surface that partially surrounds an increased amount of topping or garnish. The curvilinear blade has an arced cutting edge and cuts foodstuff to produce uniquely shaped segments of foodstuff. Cutting may include such actions as trimming and pairing. Cutting may involve splitting a foodstuff into multiple segments without destroying a portion of the foodstuff. Cutting may also include removing a slight amount of material in a manner similar to a saw to arrive at multiple segments of foodstuff. The cutting assembly may be used as part of an industrial process to treat thousands of pounds of soft foodstuff or hard foodstuff. Examples of soft foodstuff include but are not limited to kiwis, mangoes, onions, papayas, peaches, pears, radishes, squash, strawberries and tomatoes. Examples of hard foodstuff include but are not limited to, potatoes, apples, carrots, cucumbers, guavas, melons, and pineapples. The cutting device may include a member for holding at least one curvilinear blade in position. The device may hold multiple blades in a number of different configurations. The device includes a housing, which may be designed in any number of ways, provided that it fits in an existing or contemplated food processing system, such as a hydraulic food cutter assembly. More specifically, the housing is designed and dimensioned to hold at least one blade-holding member, which holds a blade and maintains it in position. The apparatus and its various elements are shown in FIGS. 1 through 11 and FIGS. 29 through 47. The concave tapered food products produced by the apparatus are shown in FIGS. 12 through 27 and FIGS. 48 through 55.

Figure 1:
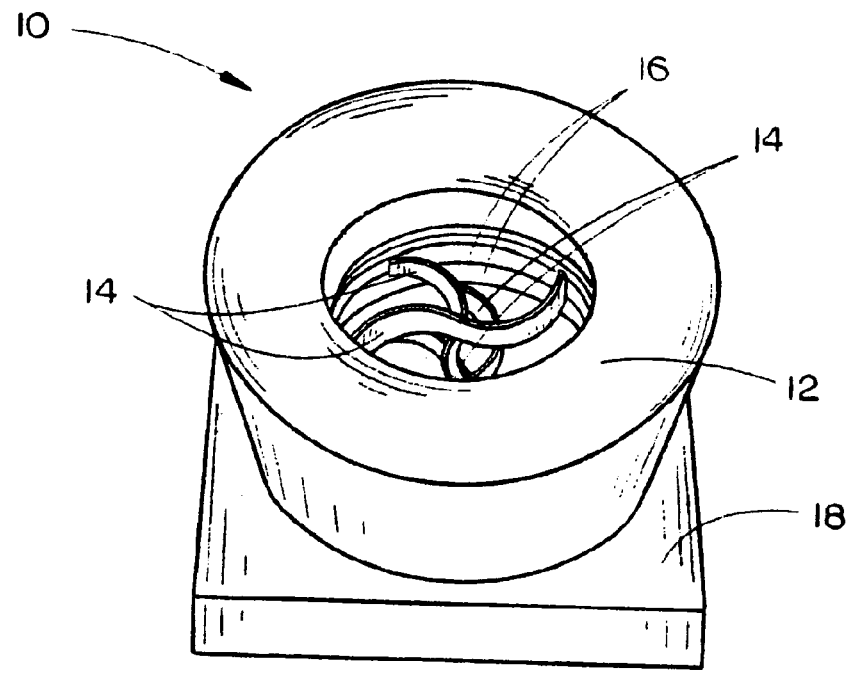
FIG. 1 is an isometric view illustrating a cutter assembly in accordance with an exemplary embodiment of the present invention, wherein the cutter assembly includes a cylindrical housing member supported by a base member, the cylindrical housing member holding ring members that each hold a curvilinear blade.

A cutter assembly 10, shown in FIG. 1, for cutting foodstuff into concave tapered food products may include at least one curvilinear blade 14 received by a blade-holding member 16, typically an annular ring member. The curvilinear blade 14 may be defined by a single arc, multiple arcs defined by a sigmoid curve, or circular. The blade holding member 16 is held or received by a housing member 12, typically the housing member 12 is of a cylindrical construction. The housing member 12 is designed and dimensioned to receive and hold the blade-holding member 16 or a curvilinear blade 14 in the absence of a blade-holding member 16. The cutter assembly 10 further includes a base member 18 affixed to the housing member 12. The base member 18 is provided for mounting the cutter assembly 10 into a food cutting apparatus, such as a hydraulic food cutting apparatus. A cutter assembly may include any configuration of blades and structure necessary to cut a foodstuff or the like. Thus, a cutter assembly 10 is provided that may be removably inserted into a cutting apparatus, whereby the device will receive and cut foodstuff, for example, as part of an industrial process. In one embodiment, the curvilinear blade 14 may cut potatoes to produce a concave tapered food product. The cutter assembly 10 may also include a spoke blade 3002 for cutting the foodstuff into smaller segments. The spoke blade 3002 may be either straight or defined by an arc and may run through the radius or diameter of the housing member 12. Additionally, the spoke blades 3002 may have ridges 50.

Figure 2:
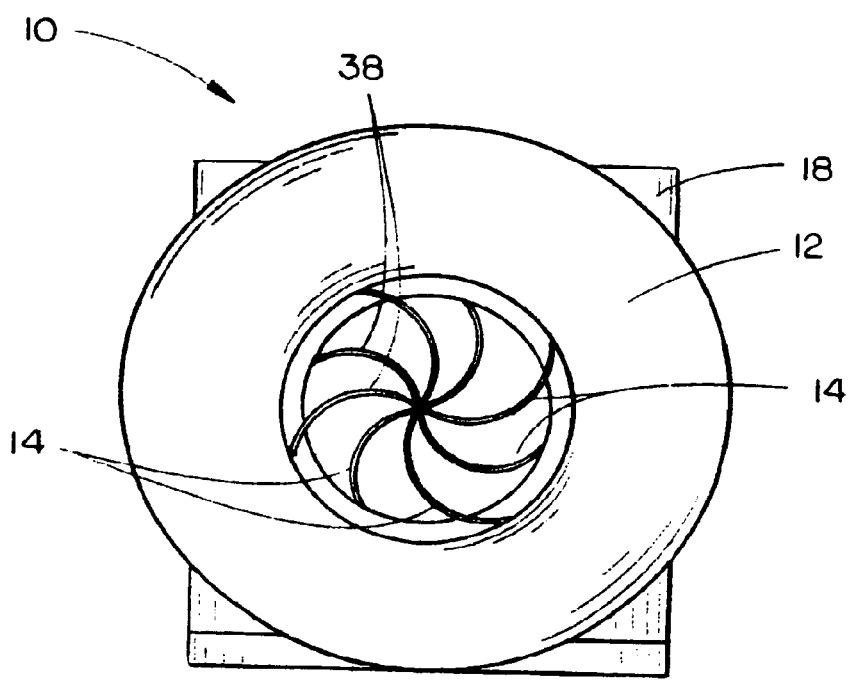
FIG. 2 is a plan view of the cutter assembly illustrated in FIG. 1.
Figure 3:
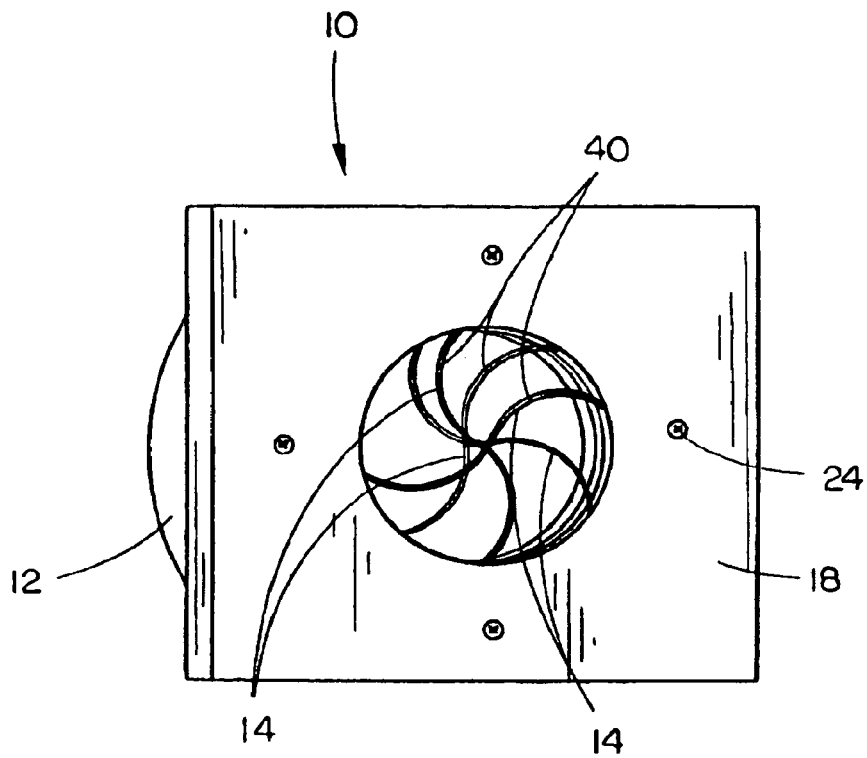
FIG. 3 is an isometric view of the cutter assembly illustrated in FIG. 1.

A cutter assembly 10 is shown in FIG. 2, including a housing member 12, curvilinear blades 14, a base member 18, and the blunt edges of the curvilinear blade 38. FIG. 3 illustrates an opposing view of the cutter assembly 10 illustrated in FIG. 2, including a housing member 12, curvilinear blades 14, a base member 18, fastening members 24 for attaching the base member 18 to the housing member 12, and a view of the knife edges 40. When the cutter assembly 10 is inserted into a cutting apparatus, the knife edges 40 of the curvilinear blades 14 may be oriented toward the uncut foodstuff or foodstuff that requires additional cutting. In general, in a cutter assembly 10 with multiple curvilinear blades 14, the knife edges 40 of the multiple curvilinear blades 40 are all oriented in the same direction. A knife edge 40 may include a sharpened edge, or an edge with teeth similar to a saw blade.

Figure 4:
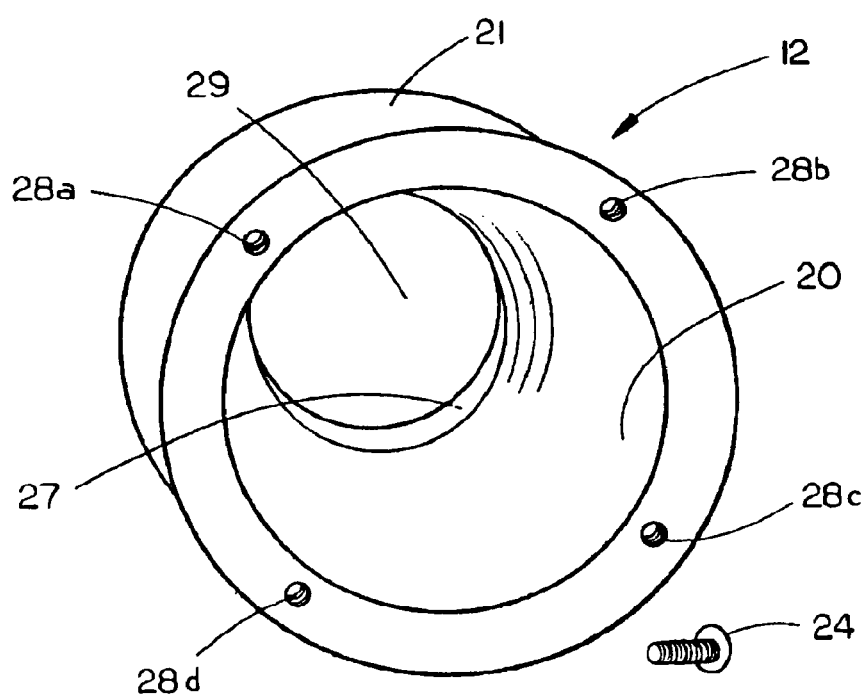
FIG. 4 is an isometric view of the cylindrical housing member illustrated in FIG. 1.

FIG. 4 shows a housing member 12 for receiving curvilinear blades 14. The housing member may be formed from a variety of materials and in a variety of shapes. Because of the design of current cutting systems, the housing member 12 typically has a cylindrical shape. Food grade plastics, such as acetyl plastic, ultra high molecular weight plastic, and high-density plastic may be used. Alternatively, the housing member 12 may be made from metal, such as stainless steel, or any other rigid material suitable for use in an industrial process. FIG. 4 also shows the inner wall of the housing member 20, the outer wall of the housing member 21, fastening members 24, the opening of the housing member 27, and housing member attachment holes 28a, 28b, 28c, 28d. A fastening member 24 may be inserted through the housing member attachment holes 28 for attaching the housing member to a base member 18 or other structure as needed.

Figure 5:
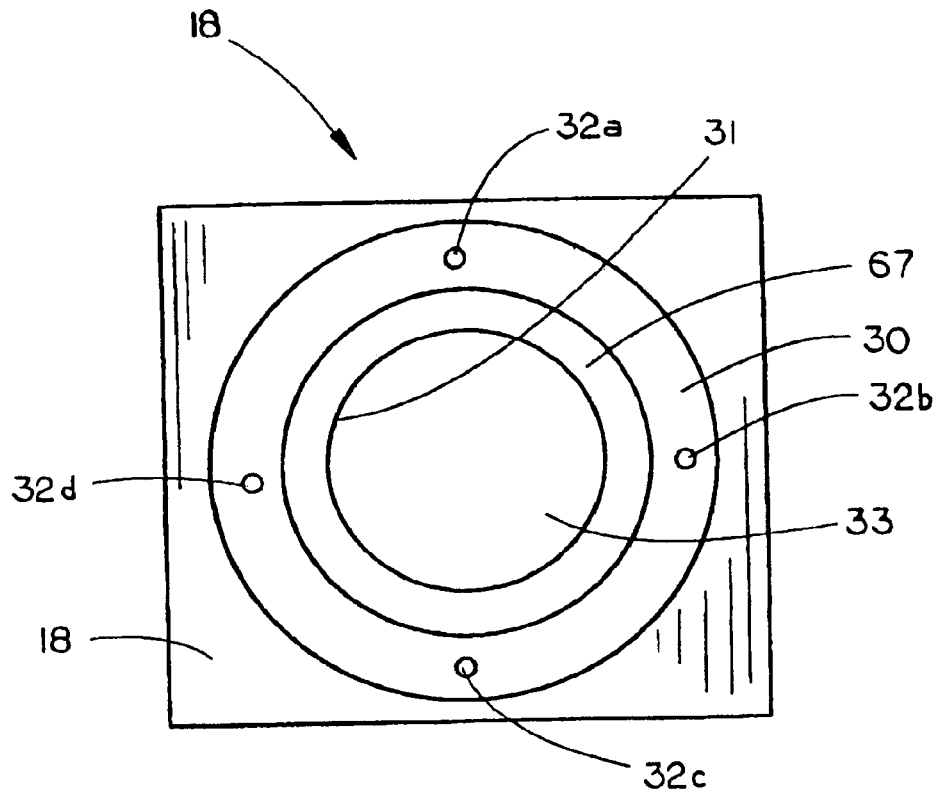
FIG. 5 is a plan view of the base member illustrated in FIG. 1.

FIG. 5 depicts a base member 18. The base member 18 may be formed from a variety of materials. For example, the base 18 may be made from a food grade plastic. Suitable plastics include acetyl plastic, ultra high molecular weight plastic, and high-density plastic. Alternatively, the base 18 may be made from metal including various types of stainless steel. The base member 18 may have an inner wall 31 with an edge, typically an annular edge, which forms an aperture 33. The base 18 member may include a housing member seat 30. The housing member seat 30 is a cut away section of the base member 18 in which the housing member 12 may be seated and secured. The base member 18 may also include base member attachment holes 32a, 32b, 32c, 32d for receiving one or more fastening members 24, shown in FIG. 3, such as screws, for holding the base member 18 in contact with the housing member 12. The fastening members 24 may be inserted through base member attachment holes 32a, 32b, 32c, 32d and threaded into the housing member attachment holes 28a, 28b, 28c, 28d, shown at FIG. 4, in the cylindrical housing member 12 affixing the base member 18 to the housing member 12 such that the housing member 12 rests on the housing member seat 30. Numerous different constructions of the base member 18 may be used. The base member 18 may be of any shape so long as it supports and holds the housing member 12, especially the curvilinear blade 14, curvilinear blade with ridges 3800, or spoke blade 3002 in the housing member 12.

Figure 10:
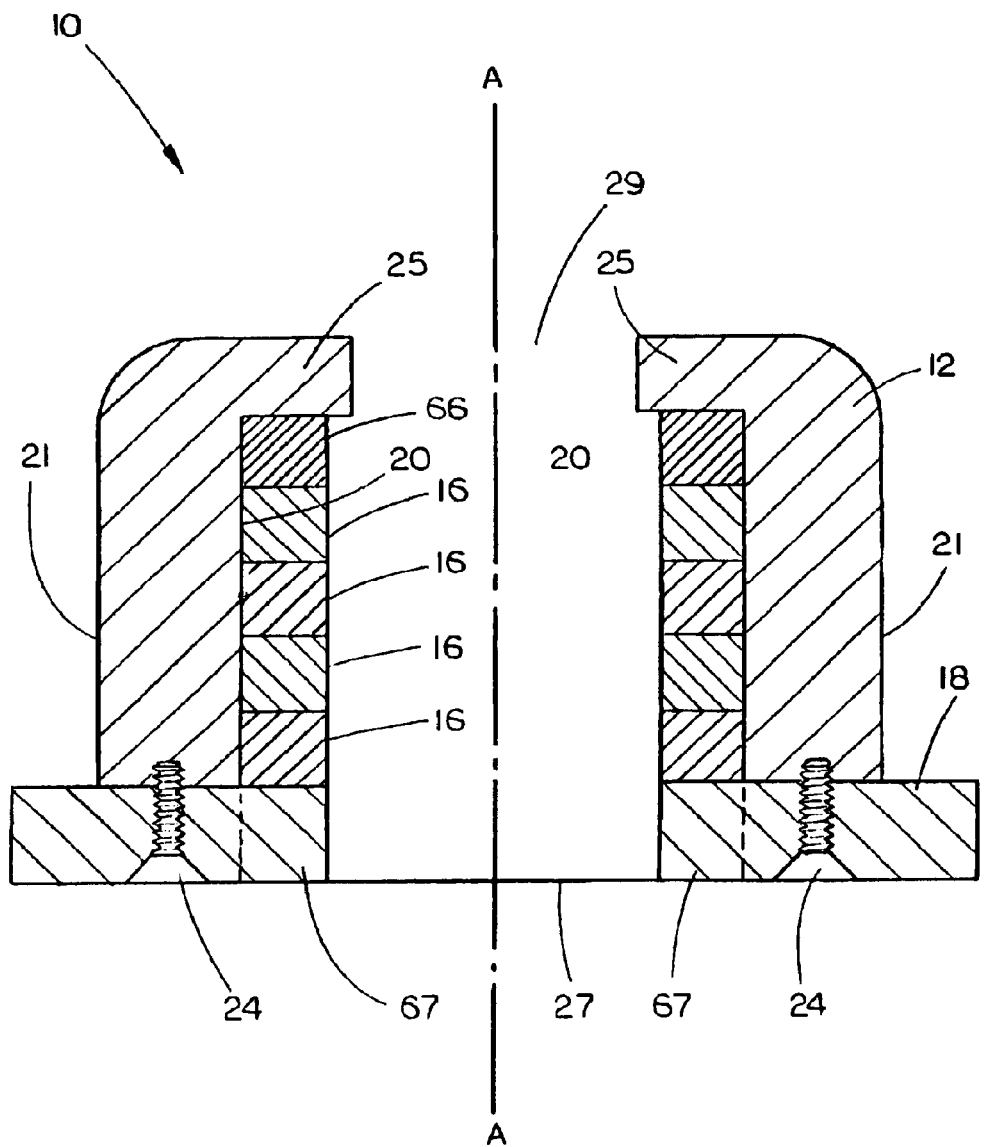
FIG. 10 is a cross-sectional side view of the cutter assembly illustrated in FIG. 1, further illustrating a cylindrical housing member that holds four ring members and an end retainer member, a base member, and several fastening members for attaching the base to the cylindrical housing.

Typically, the housing member 12 has a cylindrical construction to form a cup shape and has an inner wall 20 and an outer wall 21, shown in FIGS. 4 and 10. The housing member 12 may have an open end 27 with the open end 27 allowing the placement of a blade holding member 16. The cup-shaped cylindrical housing member 12 may have a base member 18 that extends inward to form an inner lip 25, shown in FIG. 10, whereby the blade holding member 16 rests on the lip 25. The lip 25 may have an edge, which forms an aperture 29. The blade holding member 16 may directly contact the lip 25 or, alternatively, the blade-holding member 16 may contact an end retainer member 66, which contacts the lip 25, shown in FIG. 10. The cup shape housing member 12 is utilized in order to conform to available industrial processes. It will be appreciated that other designs may be utilized, provided the blades 14 and 3800 are held in position and the cutter assembly 10 may be used with an industrial food processing system.

Figure 6:
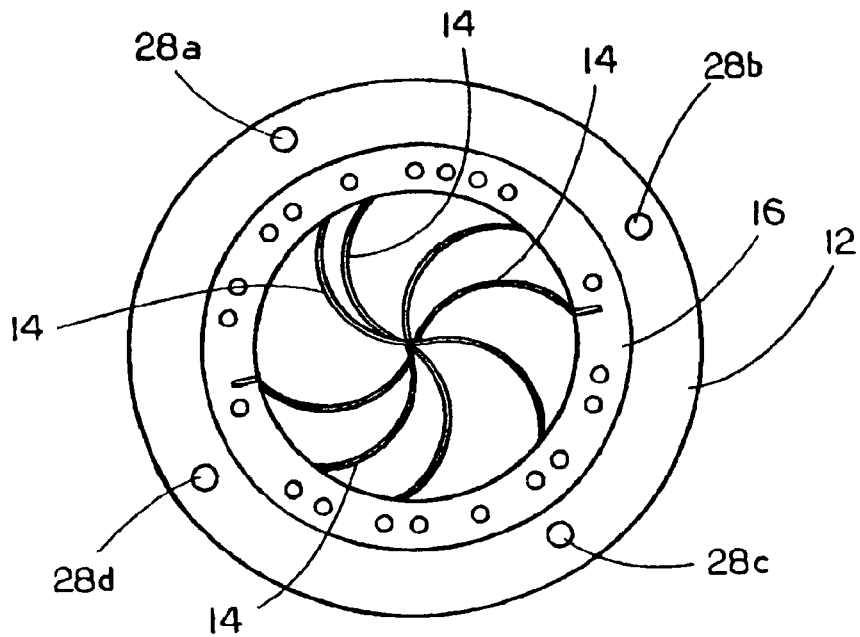
FIG. 6 is a plan view of the cylindrical housing member illustrated in FIG. 1, wherein the cylindrical housing member is shown holding ring members that each hold a curvilinear blade.

FIG. 6 illustrates a housing member 12 enclosing at least one blade holding member 16. The blade holding member holds a curvilinear blade 14. FIG. 6 also illustrates housing member attachment holes 28a, 28b, 28c, and 28d. The blade holding member 16 may conform to the shape of the housing member 12, which, again, is shaped and designed for use in an industrial process. A variety of shapes and sizes can be used as needed. The blade holding member 16 is typically a ring designed and dimensioned to receive at least one curvilinear blade 14. In alternative embodiments, the blade holding member 16 may hold curvilinear blades with ridges 3800 and spoke blades 3002.

Figure 7A:
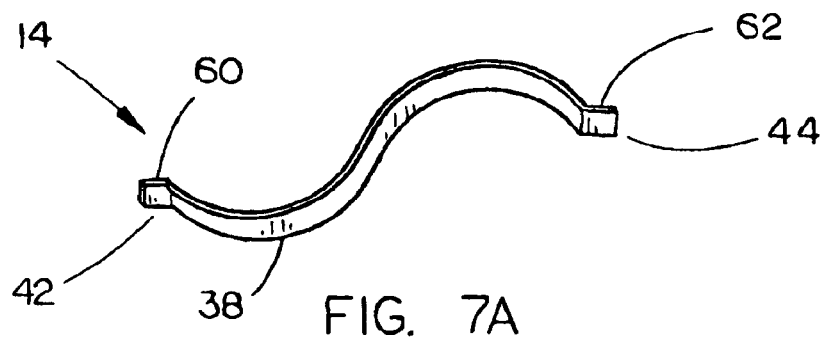
FIG. 7A is an isometric view of a curvilinear blade illustrated in FIG. 6.

FIG. 7A illustrates a curvilinear blade 14, including a blunt edge 38, a sharpened knife edge 40, opposite blade ends 42, 44, and an attachment means 60, 62. An attachment means 60, 62 may include any method known in the art for attaching the curvilinear blade 14 to a cutter assembly 10, or a blade holding member 16. Attachment means may include but are not limited to: a planar foot, a curved foot, welding, bolting, pinning, soldering, fastening, and the like. The attachment means may either permanently or removably attach the curvilinear blade 14 in a cutter assembly 10. If a curvilinear blade 14 is removably attached to a cutter assembly 10 the curvilinear blade 14 must be attached securely to minimize the likelihood of a curvilinear blade 14 from unintentionally becoming separated from the cutter assembly 10. In a further embodiment, the curvilinear blade with ridges 3800 may have two sharpened knife edges 40, making the knife reversible. The curvilinear blade 14 depicted in FIG. 7A is s-shaped and may be defined by a sigmoid curve. In alternative embodiments, the curvilinear blade 14 may be defined by a single arc or curve, including a complete circle. In a further embodiment, a curvilinear blade 14 has only one attachment means 60, 62. The curvilinear blade 14 may be made from stainless steel, such as heat treatable stainless steel. Suitable types of stainless steel include certain varieties of 400 series stainless steel, such as 410 series stainless steel, 420 series stainless steel, and 440 series stainless steel. Other hardened materials for cutting may be used as needed. The curvilinear blade 14 may have an arc radius ranging from approximately ½ of an inch to 3 inches and an arc length ranging from approximately ½ of an inch to 3 inches.

Figure 7B:
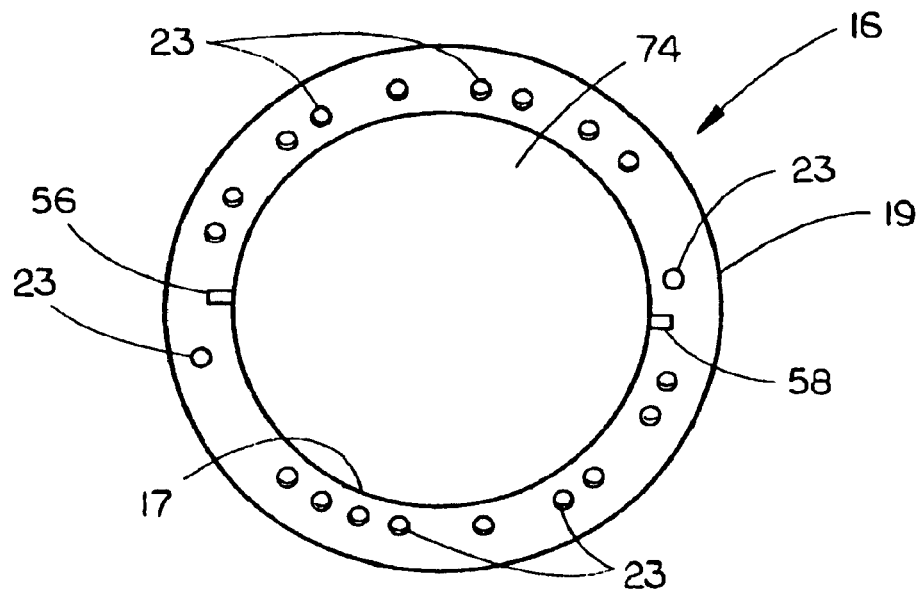
FIG. 7B is a plan view of a ring member illustrated in FIG. 6.

FIG. 7B depicts a blade holding member 16. The blade holding member 16 is typically a ring. The blade holding member 16 may have two slots, 56 and 58, designed and dimensioned to receive the attachment means 60, 62 of a curvilinear blade 14. More specifically, each slot may be designed to receive an attachment means 60, 62 disposed at opposite ends 42, 44 of the curvilinear blade 14. Each pair of slots 56, 58 may be positioned on the blade holding member 16 for receiving the attachment means 60, 62 of the curvilinear blade 14. In additional embodiments, the blade holding member 16 may only have one slot 56, 58 if used to hold a curvilinear blade 14 with only one attachment means 60, 62. Further the blade holding member 16, depicted in FIG. 7B may be configured for holding a curvilinear blade with ridges 3800 or a spoke blade 3002.

The ring member 16 shown in FIG. 7B may be formed from a variety of materials. Typically, the ring member 16 is made from a food grade metal, such as stainless steel, i.e., 300 series stainless steel. The ring member 16 has an aperture 74, which is formed by the inner wall of the blade holding member 17. The blade holding member 16 typically has an outer wall 19, such as an annular edge. The ring member 16 may also have a plurality of perforations 23. Typically, the ring member 16 has between two and twenty perforations 23. The ring member 16 generally has an even number of symmetrically spaced perforations 23.

Figure 7C:
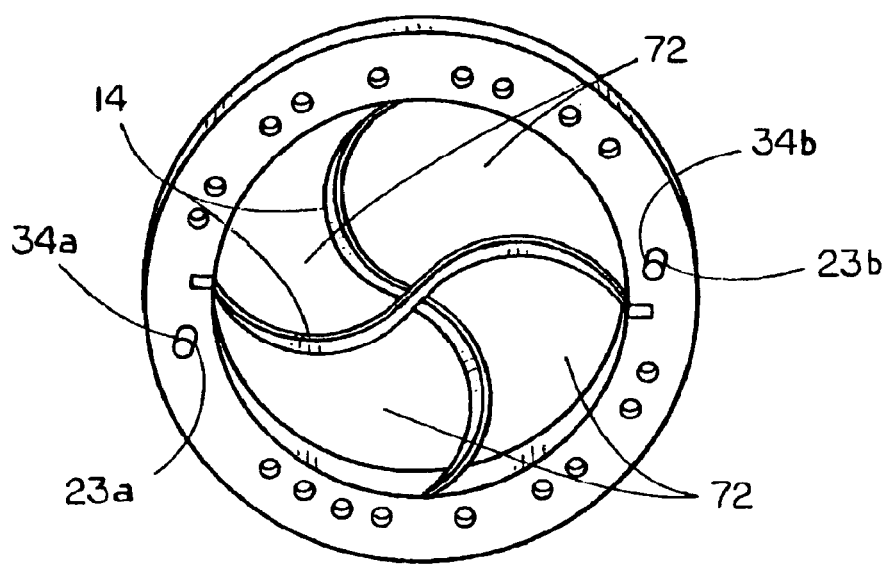
FIG. 7C is a plan view of a stack of two of the ring members illustrated in FIG. 6, wherein each ring member holds a curvilinear blade.

FIG. 7C depicts several blade holding members 16 stacked together including a housing member 12, a plurality of curvilinear blades 14, blade holding member perforations 23a, 23b, bar members 34a, 34b, and blade angles 72. When blade holding members 16 are stacked together, at least one pair of blade holding member perforations 23a, 23b align axially. The aligned ring member perforations may be connected using bar members 34a, 34b. In one embodiment, aligned perforations 23a, 23b form a threaded hole, which receives the bar member 34a, 34b. In this embodiment, the bar members 34a, 34b are utilized for stabilizing the stack of blade holding members 16 and preventing the blade holding members 16 from rotating when the cutter assembly 10 is in use. The housing member 12 may be designed to partially enclose the blade for shielding the blade. Additionally, the housing member 12 may enclose the blade and assist in capturing the cut foodstuff.

The curvilinear blade 14 may be removably attached to the blade holding member 16. Each blade holding member 16 may receive at least one curvilinear blade 14. Specifically, the curvilinear blade 14 may be received transverse the blade holding member aperture 74 of the blade holding member 16. The blade holding member 16 is intended to hold the curvilinear blade 14 in position to cut a foodstuff. Further, the blade holding member 16 may be of any shape, so long as it may be received by the housing member 12 and may position the curvilinear blade 14 to cut foodstuff. Moreover, the curvilinear blades 14 in a cutter assembly 10, particularly the blade angle 72, may be modified, thereby modifying the dimensions and form of the resultant food product.

FIG. 7C depicts two blade holding members 16, each blade holding member 16 with an integral curvilinear blade 14. The blade holding members 16 are stacked together, and symmetrically arranged perforations 23a, 23b, 23c, and 23d may allow for the adjustment of the blade angle 72 between the curvilinear blades 14 by rotating one or more of the blade holding members 16 in the stack. In this context, the angle between the curvilinear blades 14 refers to the rotation (of the rings) required to superimpose one curvilinear blade 14 on the other curvilinear blade 14. Adjusting the angles between the curvilinear blades 14 may alter the dimensions of the foodstuff segments produced by the cutting assembly 10. The perforations 23a, 23b in a blade holding member 16 may be arranged or spaced in any of a variety of ways such that when one or more ring members 16 are stacked together, the angles between the curvilinear blades 14 are adjustable by rotating one or more of the blade holding members 16. In general, any of a variety of constructions may be used such that the angles between the curvilinear blades 14 are adjustable without having to move the blades 14, themselves, thereby decreasing the risk of injury. In further embodiments, the curvilinear blades 14 depicted in FIG. 7C may be replaced or used in combinations with curvilinear blades with ridges 3800 and spoke blades 3002.

Figure 8:
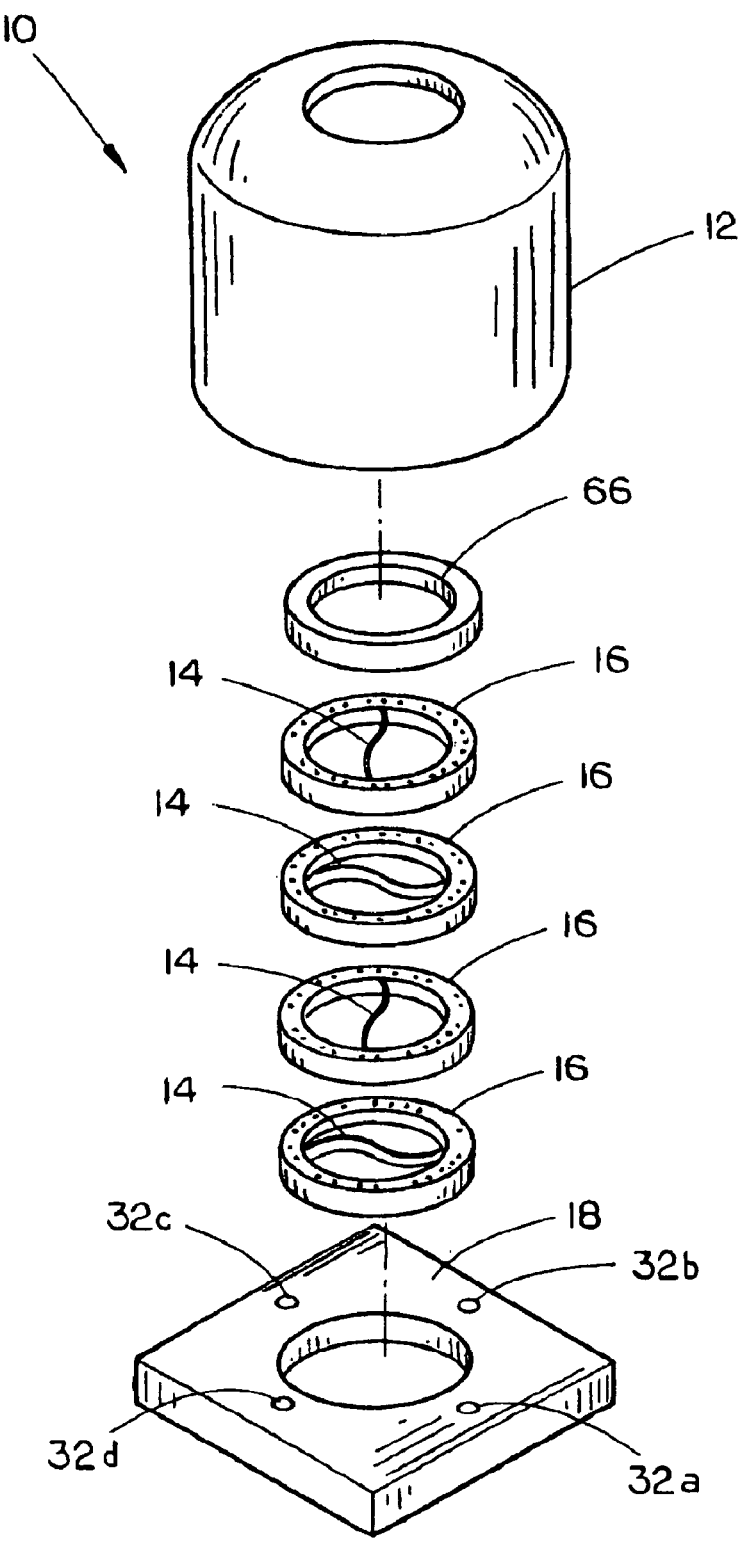
FIG. 8 is an exploded isometric view of the cutter assembly illustrated in FIG. 1, further illustrating an end retainer member.

FIG. 8 illustrates an exploded view of a cutter assembly 10, including a housing member 12, a plurality of curvilinear blades 14, a plurality of blade holding members 16, a base member 18, a plurality of base member attachment holes 32a, 32b, 32c, 32d, and an end retainer member 66. The cutter assembly 10 may include from one to sixteen curvilinear blades 14. Typically, the cutter assembly 10 includes at least one curvilinear blade 14 received by a blade holding member 16 and a housing member 12 that receives and holds the blade holding member 16. The cutter assembly 10 may comprise from one to sixteen blade holding members 16 where each ring 16 receives at least one curvilinear blade 14. In some alternatives, the cutter assembly 10 may comprise four ring members 16, each ring 16 receiving at least one curvilinear blade 14. In further embodiments, the curvilinear blades 14 may be partially or completely replaced with curvilinear blades with ridges 3800 or spoke blades 3002.

Figure 9:
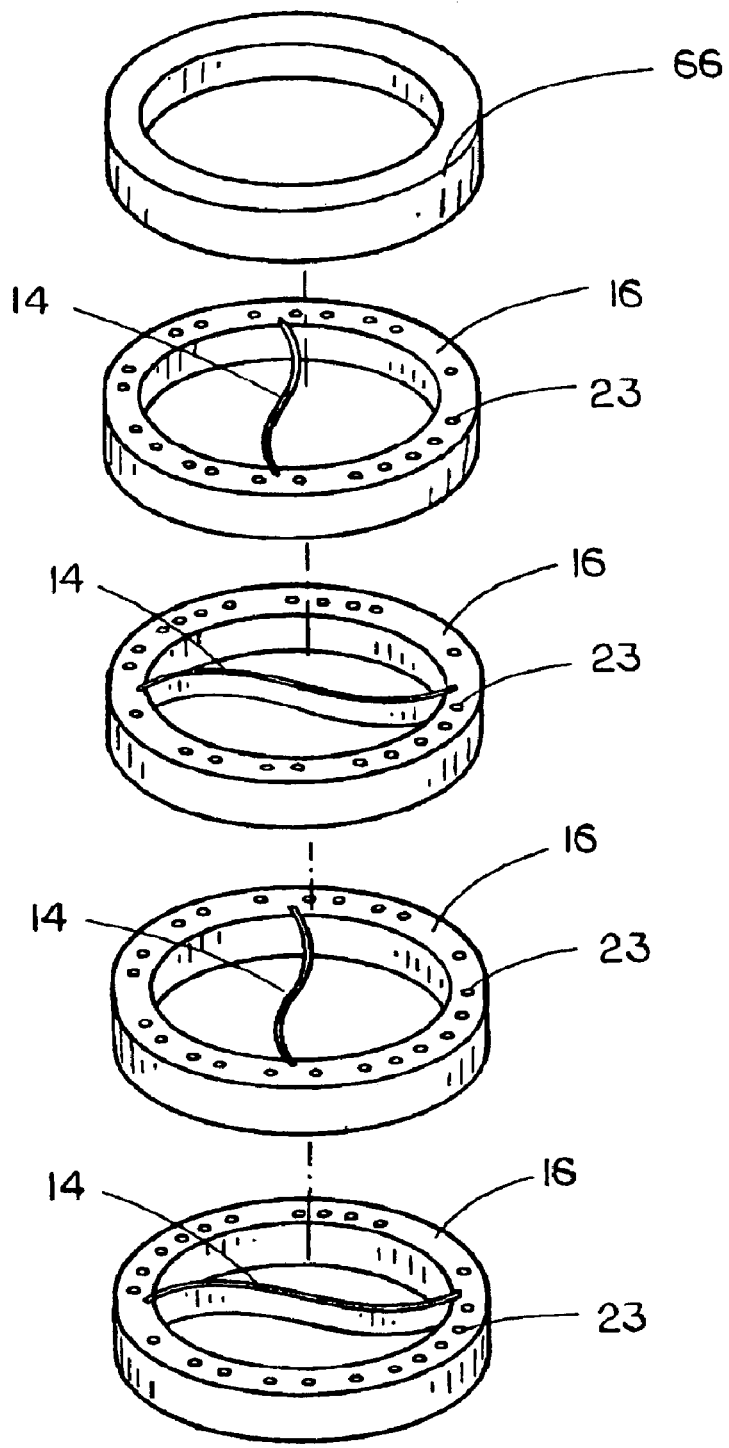
FIG. 9 is an exploded isometric view of the ring members, curvilinear blades, and the end retainer member illustrated in FIG. 8.

FIG. 9 illustrates an end retainer member 66, a plurality of blade holding members 16, including a plurality of blade holding member perforations 23, with each blade holding member 16 holding one curvilinear blade 14. FIG. 9 illustrates how the blade holding member perforations 23 may be used to alter the position of the curvilinear blades to create a blade angle 72. FIG. 9 depicts the blade holding members 16 housing curvilinear blade 14. In alternative embodiments, the blade holding member 16 may be used to house curvilinear blades with ridges 3800, or spoke blades 3002.

FIG. 10 illustrates a side cutaway view of a cutter assembly 10, including a housing member 12, a blade holding member 16, a base member 18, the inner wall of the housing member 20, the outer wall of the housing member 21, fastening members 24, the inner lip of the housing member 25, the open end of the housing member 27, the housing member aperture 29, an end retainer member 66, and the inner cutaway of the base member 67. The inner wall 20 of the cylindrical housing member 12 may receive and hold at least one annular ring member 16. On one end of a cutter assembly, the blade holding member 16 rests on the lip 25 of the cylindrical housing member 12, contacting the end retainer member 66, which is also typically a ring. The end retainer member 66 may relieve friction between the blade holding member 16 that it contacts and the housing member 12. On the opposing end of the cutter assembly 10, the annular ring member 16 rests on the base member 18, specifically the inner cut-away 67 of the base member. The housing member 12 may typically hold between one and sixteen blade holding members 16. For instance in specific embodiment, the housing member 12 receives and holds one to ten blade holding members 16, and more likely four blade holding members 16. Generally, one curvilinear blade 14 is disposed in each blade holding member 16. In further embodiments, curvilinear blades with ridges 3800 or spoke blades 3002 may be disposed in the blade holding member 16 instead of curvilinear blades 14.

Figure 11:
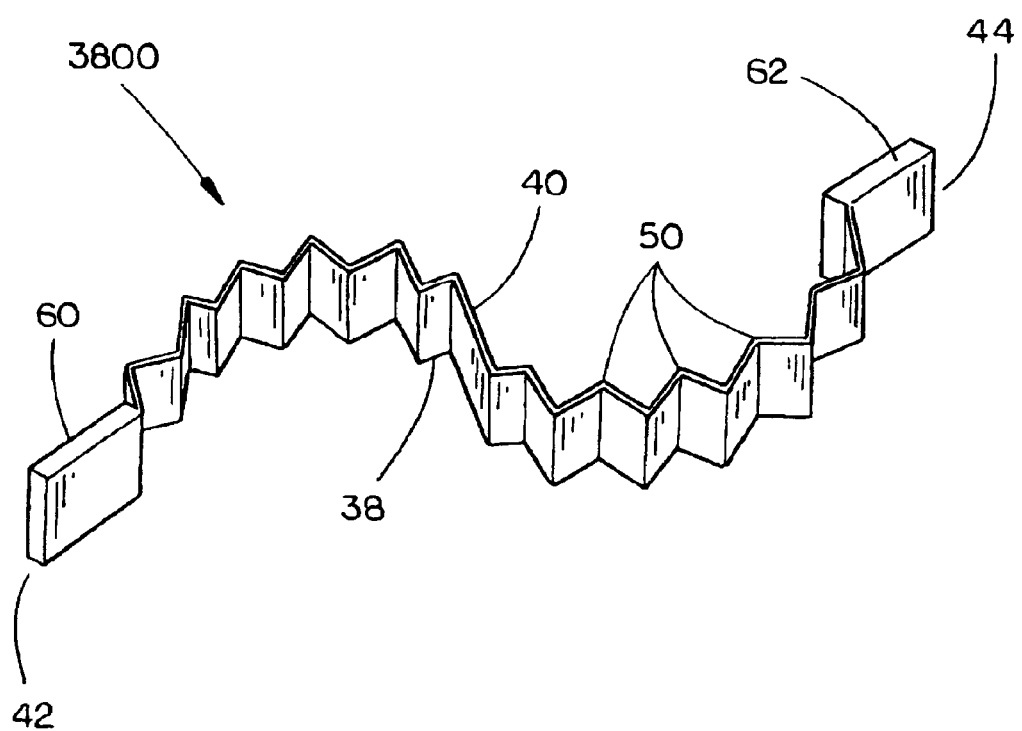
FIG. 11 is an isometric view of a curvilinear blade with ridges in accordance with an exemplary embodiment of the present invention.
Figure 12:
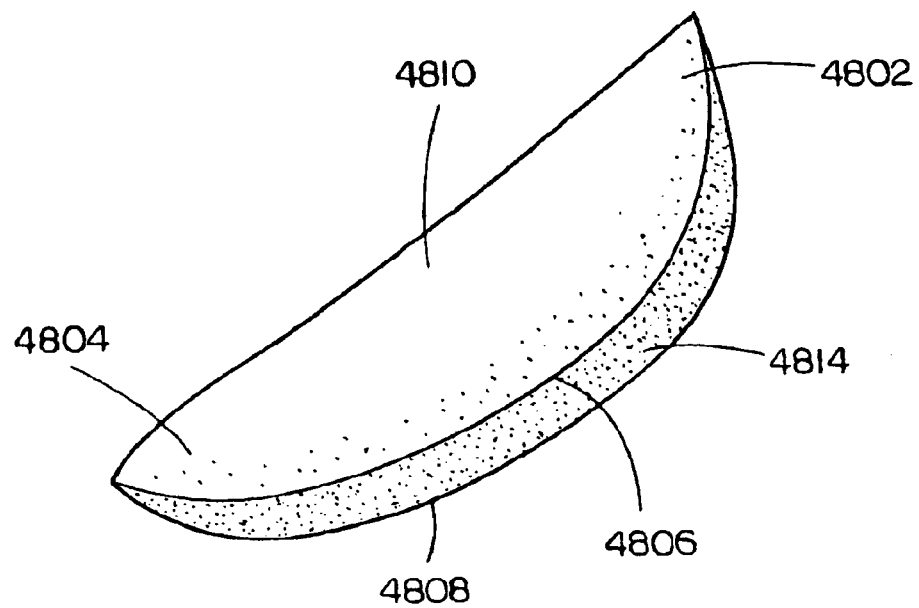
FIG. 12 is an isometric view of a concave tapered food product in accordance with an exemplary embodiment of the present invention.
Figure 13:
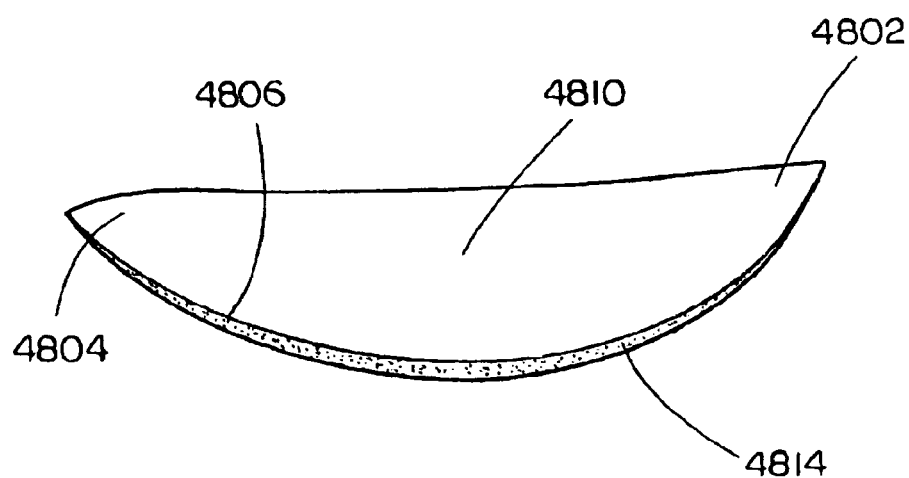
FIG. 13 is a plan view of the concave tapered food product illustrated in FIG. 12.
Figure 14:
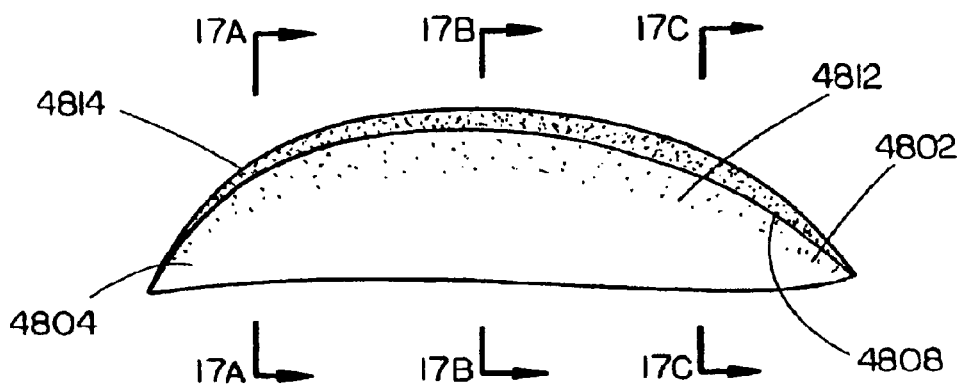
FIG. 14 is a bottom view of the concave tapered food product illustrated in FIG. 12.
Figure 15:
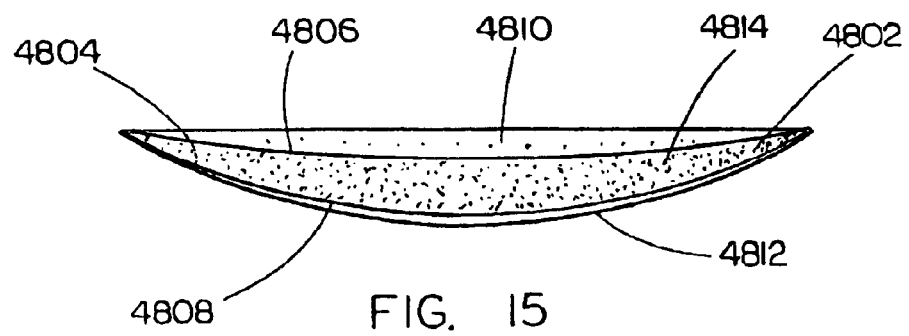
FIG. 15 is a front side view of the concave tapered food product illustrated in FIG. 12.
Figure 16:
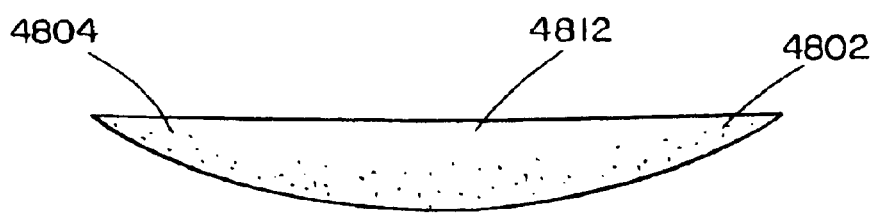
FIG. 16 is a rear side view of the concave tapered food product illustrated in FIG. 12.
Figures 17A, 17B, 17C:
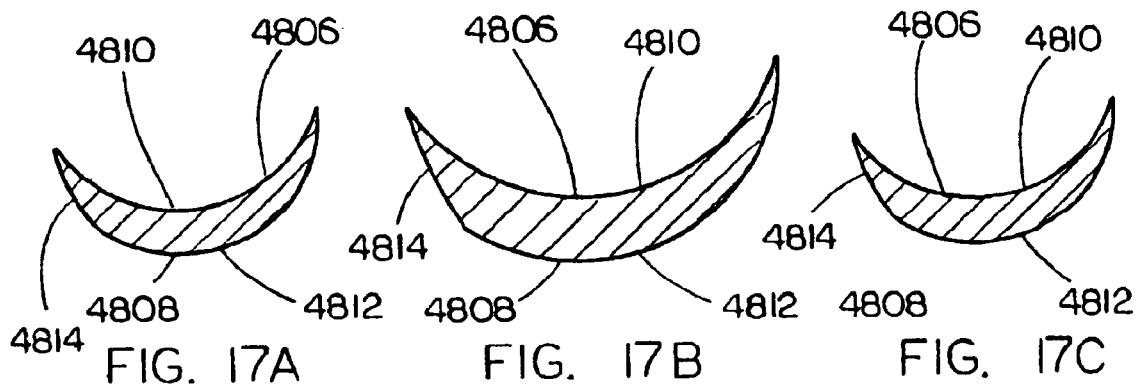
FIG. 17A is a cross-sectional end view of the concave tapered food product illustrated in FIG. 14.
FIG. 17B is another cross-sectional end view of the concave tapered food product illustrated in FIG. 14.
FIG. 17C is a further cross-sectional end view of the concave tapered food product illustrated in FIG. 14.
Figure 18:
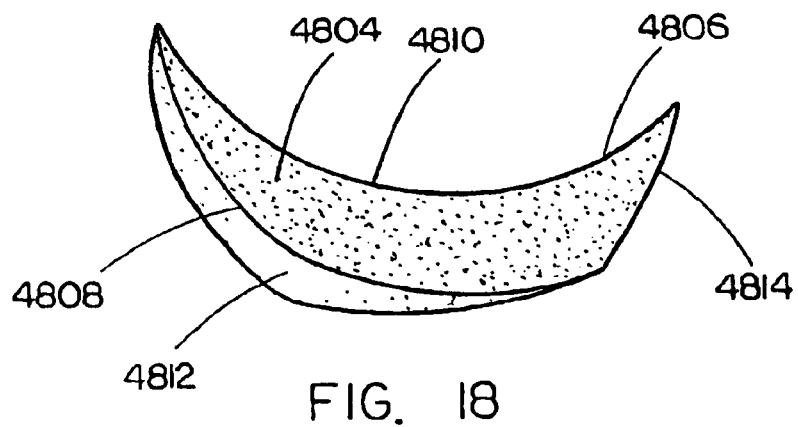
FIG. 18 is a left side view of the concave tapered food product illustrated in FIG. 14.
Figure 19:
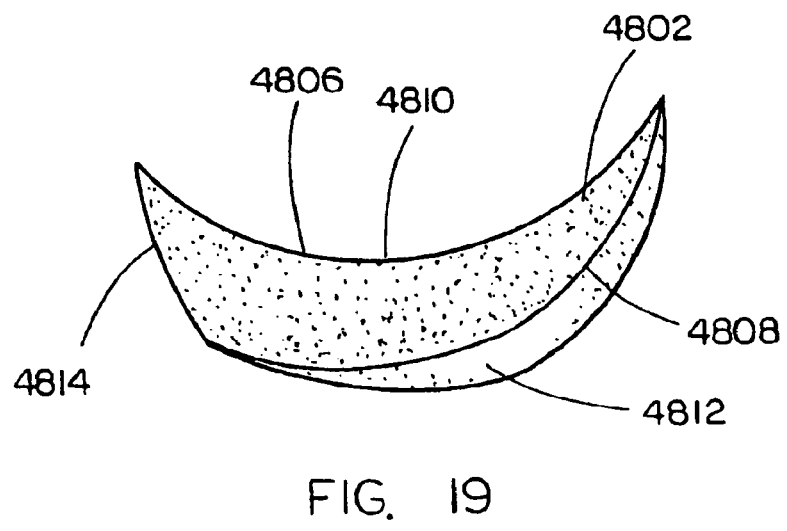
FIG. 19 is a right side view of the concave tapered food product illustrated in FIG. 14.
Figure 20:
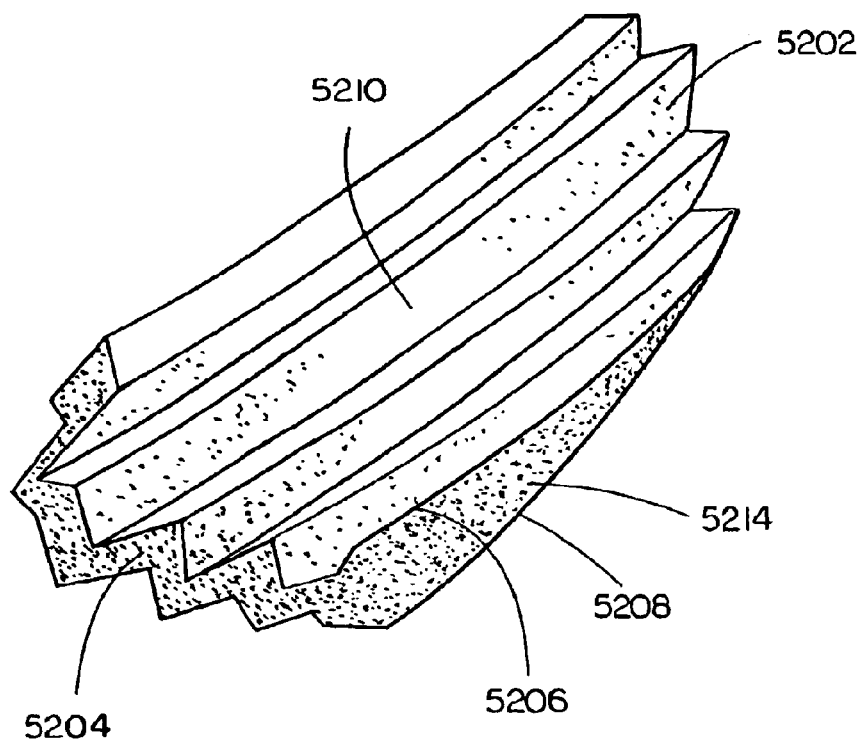
FIG. 20 is an isometric view of a concave tapered food product with ridges in accordance with an exemplary embodiment of the present invention.
Figure 21:
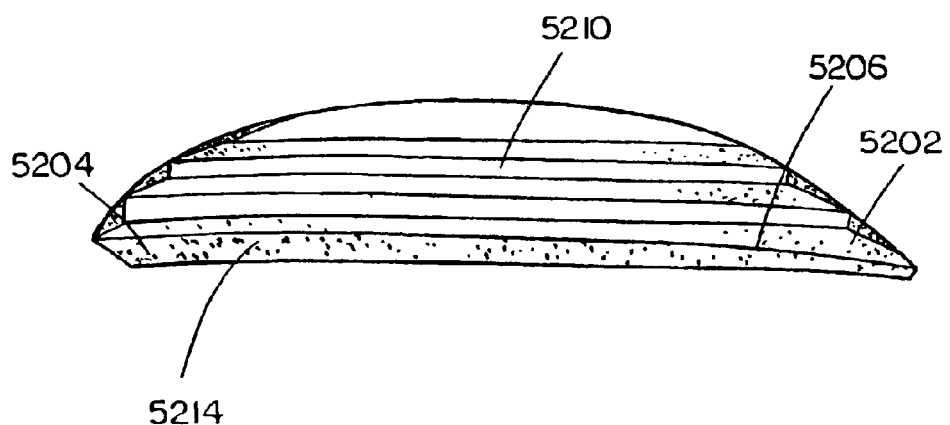
FIG. 21 is a plan view of the concave tapered food product with ridges illustrated in FIG. 20.
Figure 22:
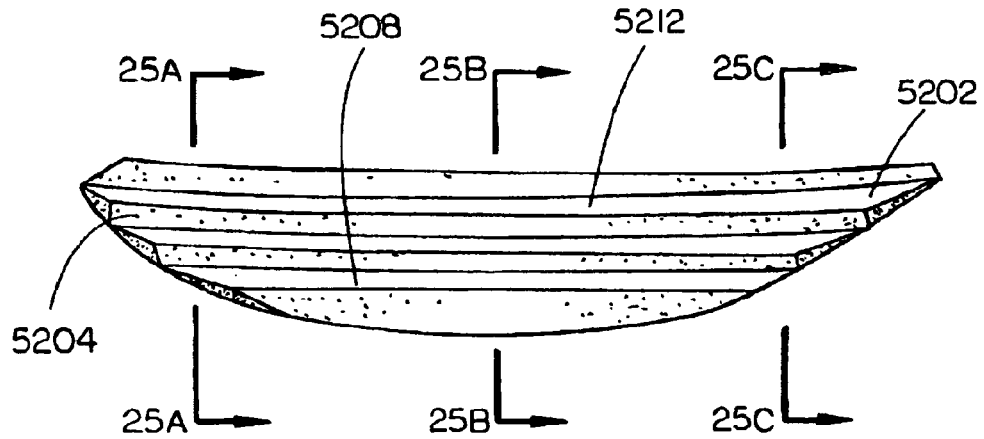
FIG. 22 is a bottom view of the concave tapered food product with ridges illustrated in FIG. 20.
Figure 23:
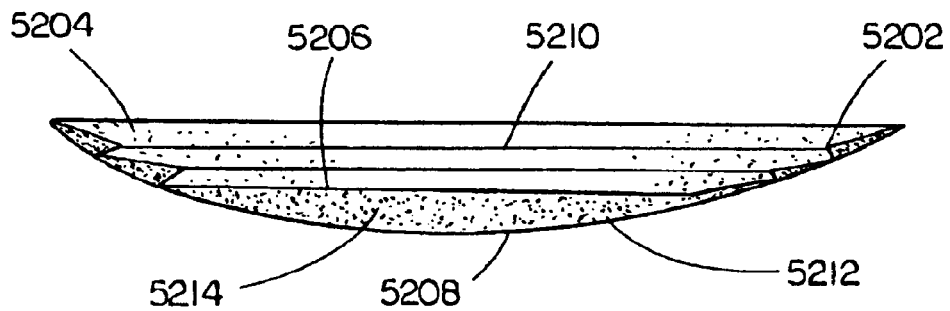
FIG. 23 is a front side view of the concave tapered food product with ridges illustrated in FIG. 20.
Figure 24:
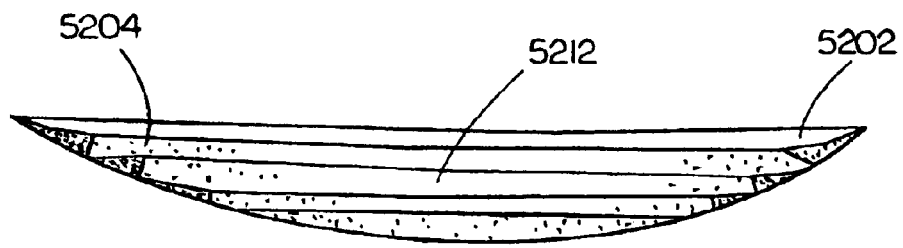
FIG. 24 is a rear side view of the concave tapered food product with ridges illustrated in FIG. 20.

FIG. 11 depicts a curvilinear blade with ridges 3800, including a blunt edge 38, a sharpened knife edge 40, opposite blade ends 42, 44, attachment means 60, 62, and ridges 50. In further embodiments, the curvilinear blade with ridges 3800 may have two sharpened knife edges 40, making the knife reversible. The curvilinear blade with ridges 3800 depicted in FIG. 11 is s-shaped and may be defined by a sigmoid curve. In alternative embodiments, the curvilinear blade with ridges 3800 may be defined by a single arc or curve, including a complete circle. Further, a curvilinear blade with ridges 3800 may only have one planar attachment means 60, 62. The curvilinear blade with ridges 3800 may be made from stainless steel, such as heat treatable stainless steel. Suitable types of stainless steel include certain varieties of 400 series stainless steel, such as 410 series stainless steel, 420 series stainless steel, and 440 series stainless steel. Additionally, other hardened materials for cutting may be utilized as needed. The knife edge 40 of the curvilinear blade with ridges 3800 may be crenulated or serrated. The curvilinear blade with ridges 3800 may be received by a blade holding member 16. The curvilinear blade 14 or 3800 may have an arc radius ranging from approximately ½ of an inch to 3 inches and an arc length ranging from approximately ½ of an inch to 3 inches. The depth of the ridges 50 on the curvilinear blade with ridges 3800 may range from approximately ⅛ of an inch to ½ of an inch.

Figure 28:
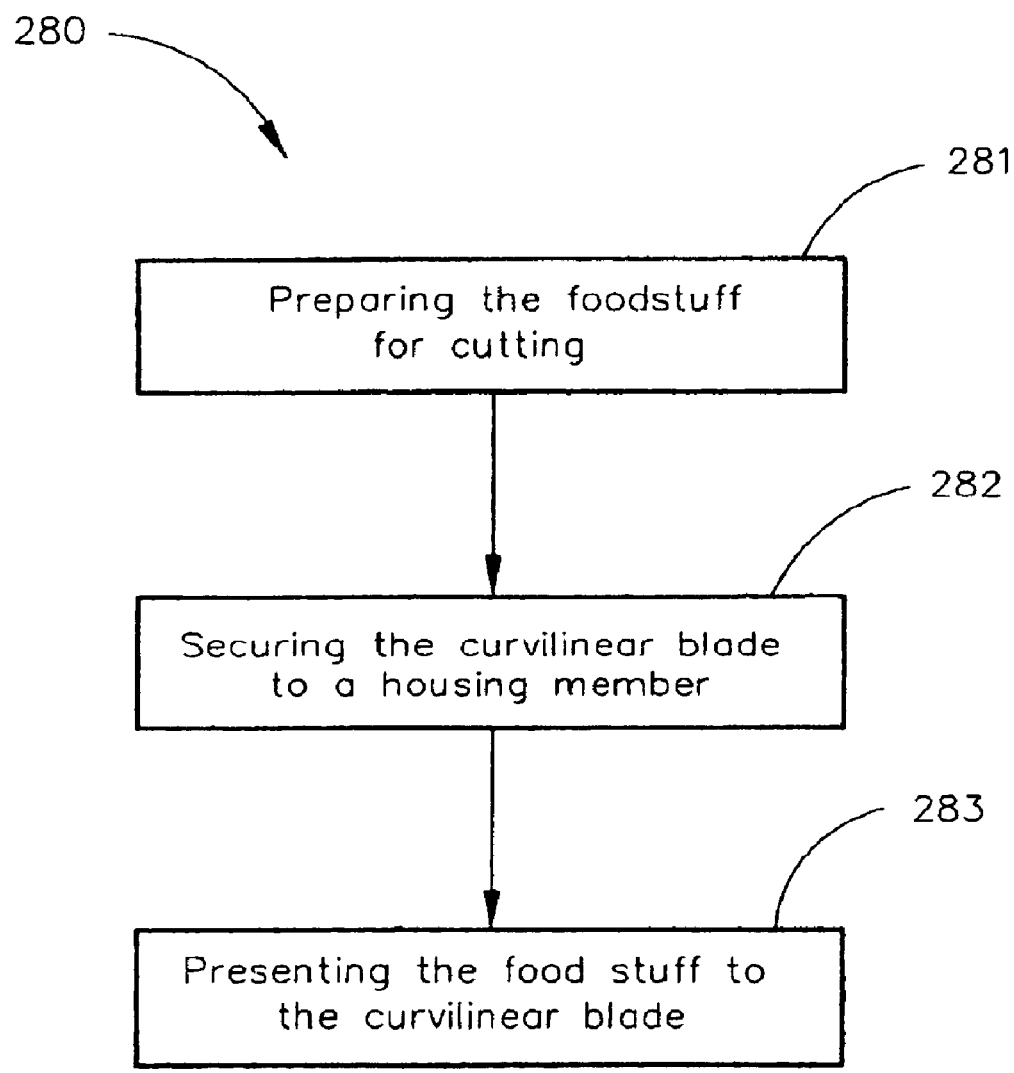
FIG. 28 is a method diagram illustrating a method for making a concave tapered food product in accordance with an exemplary embodiment of the present invention.

FIG. 28 illustrates the process 280 for making the concave tapered food product. The process for making the concave tapered food product 280 include preparing the foodstuff for cutting 281, securing the curvilinear blade to a housing member 282, presenting the foodstuff to the curvilinear blade 283. Preparing the foodstuff for cutting may include, but is not limited to, cleaning the foodstuff, softening the foodstuff, hardening the foodstuff, or other methods known in the art for preparing the foodstuff for cutting. In one embodiment, preparing the foodstuff for cutting involves softening the foodstuff by warming the foodstuff to a temperature of 100 degrees Fahrenheit. The temperature may range from approximately 80 degrees Fahrenheit to approximately 130 degrees Fahrenheit. In a further embodiment, preparing the foodstuff for cutting 281 involves chilling the foodstuff to harden the foodstuff. To achieve a satisfactory cut, it may be necessary to harden a soft foodstuff to minimize compression when the blade contacts the foodstuff. In an additional embodiment, preparing the foodstuff for cutting includes cleaning the foodstuff. Securing the curvilinear blade to a housing member 282 may be achieved by using an attachment means to attach the curvilinear blade 14 to a housing member. The curvilinear blade 14 may be permanently or removably attached to a housing member 12, provided that the curvilinear blade is securely attached to the housing member 12. Presenting the foodstuff to the curvilinear blade at a speed effective for cutting 283, may include speeds ranging from approximately 40 feet per second to approximately 60 feet per second. In one particular embodiment of method 280, a potato is prepared for cutting 281 by warming the potato to a temperature of approximately 100 degrees Fahrenheit. The curvilinear blades are secured to a housing member 282 by using an attachment means that including a curved foot. The potato is presented to the curvilinear blades 283 at a speed of approximately 45 feet per second. The concave tapered food product resulting from the process 280 may be used in combination with a garnish such as a cheese dip. In another embodiment, an apple is prepared for cutting 281 by cleaning the apple and removing the apple core. The curvilinear blades may be attached to a housing member 282 by welding the curvilinear blade to the housing member. In this embodiment, the apple is presented to the curvilinear blades 283 at a speed of approximately 40 feet per second. The resulting concave tapered apple product may be used in combination with a garnish such as caramel dip.

Topping and garnish is often used on food for enhancing the flavor of the food for producing a unique tasting food by combining multiple flavors. Some examples of toppings and garnishes may include: salad dressing, spinach dip, caramel dip, salsa, cheese, peanut butter, guacamole, cranberry sauce, fruit jelly, and ketchup. In one embodiment, a topping of caramel is utilized as a garnish. In another embodiment, a topping of peanut butter is utilized as a garnish. In an alternative embodiment, a salad dressing is utilized as a garnish.

Figure 29:
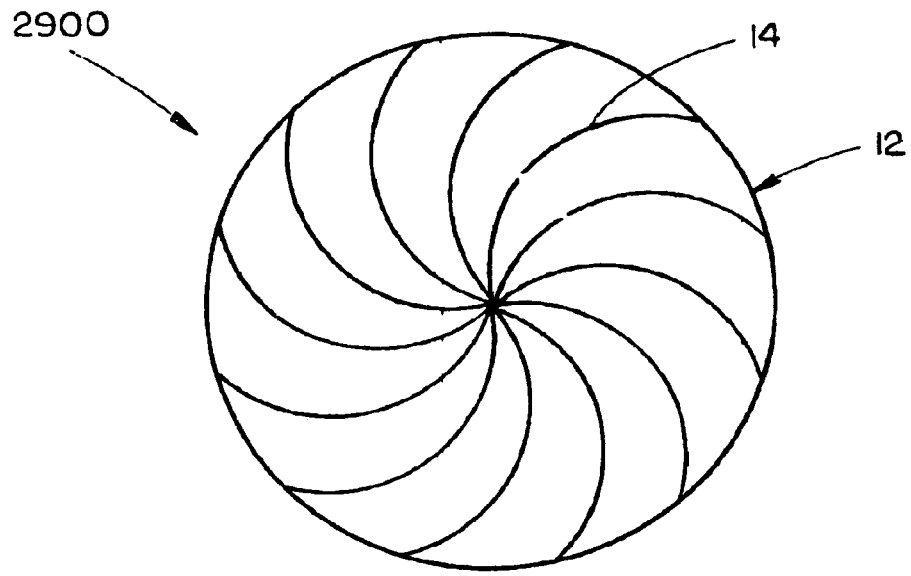
FIG. 29 is a plan view illustrating a plurality of curvilinear blades in a specific configuration for producing a concave tapered food product in accordance with an exemplary embodiment of the present invention, wherein the plurality of curvilinear blades are retained in a housing member.

FIG. 29 is a top view of a blade configuration 2900 for a cutter assembly 10, including the housing member 12 and a plurality of curvilinear blades 14. FIG. 29 illustrates a configuration for a plurality of curvilinear blades 14 that are s-shaped which may be defined by a sigmoid curve. The configuration for the plurality of curvilinear blades 14 illustrated in FIG. 29 may yield twelve substantially similarly shaped food products. The number of curvilinear blades housed within a cutter assembly 10 may range from one blade to about sixteen blades.

Figure 30:
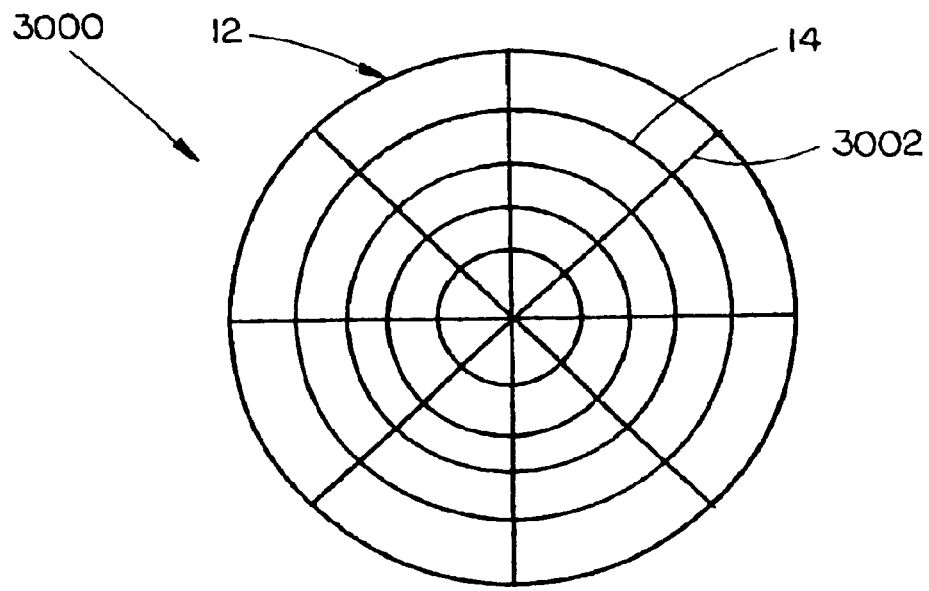
FIG. 30 is a plan view illustrating a plurality of curvilinear blades and spoke blades in a specific configuration for producing a concave tapered food product in accordance with an exemplary embodiment of the present invention, wherein the plurality of curvilinear blades are retained in a housing member.

FIG. 30 illustrates a top view of a blade configuration 3000 for a cutter assembly 10 including the housing member 12, a plurality of curvilinear blades 14, and a plurality of spoke blades 3002. The spoke blades 3002 may be used to cut the foodstuff into cross sections. The spoke blade 3002 may be straight, as illustrated in FIG. 30. The spoke blades 3002 may also be curvilinear in shape. The configuration of curvilinear blades 14 illustrated in FIG. 30 may produce up to about forty substantially similar food products from a single foodstuff.

Figure 31:
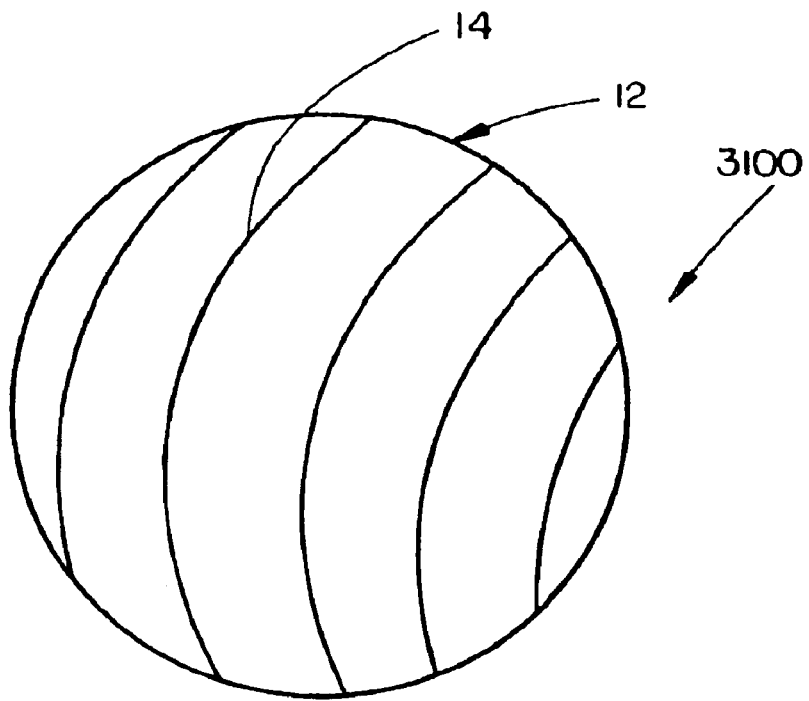
FIG. 31 a plan view illustrating a plurality of curvilinear blades in another specific configuration for producing a concave tapered food product in accordance with an exemplary embodiment of the present invention, wherein the plurality of curvilinear blades are retained in a housing member.

FIG. 31 illustrates a top view of a blade configuration 3100 for a cutter assembly 10, including a housing member 12, and a plurality of curvilinear blades 14. The configuration of the plurality of curvilinear blades 14 illustrated in FIG. 31 is similar to a series of concentric arcs. The configuration of blades illustrated in FIG. 31 may provide segments of a food product that may vary in length but may have substantially similar curved sides 4810 and 4812 which may allow for the product to be used to create aesthetically pleasing designs.

Figure 32:
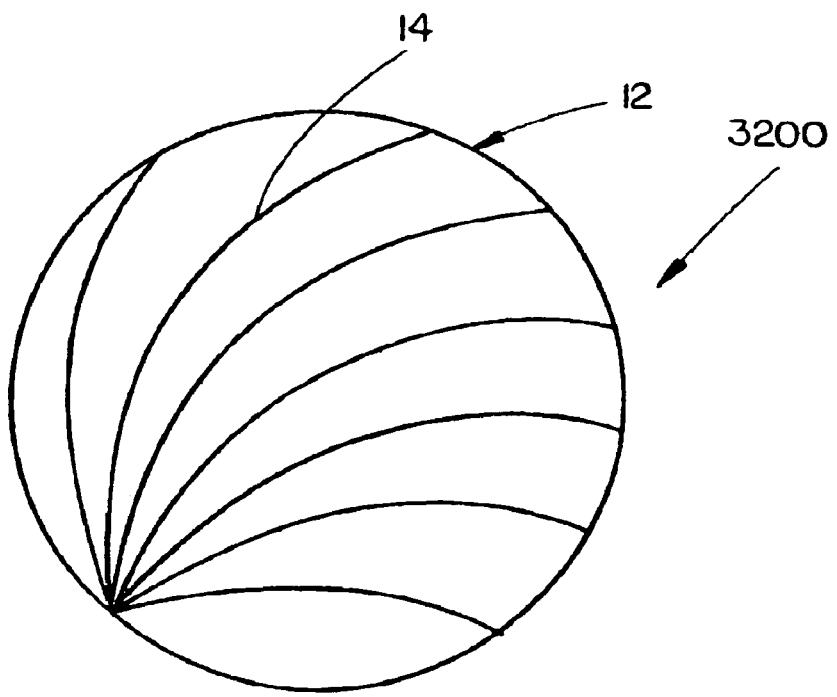
FIG. 32 is a plan view illustrating a plurality of curvilinear blades in a further specific configuration for producing a concave tapered food product in accordance with an exemplary embodiment of the present invention, wherein the plurality of curvilinear blades are retained in a housing member.
Figure 60:
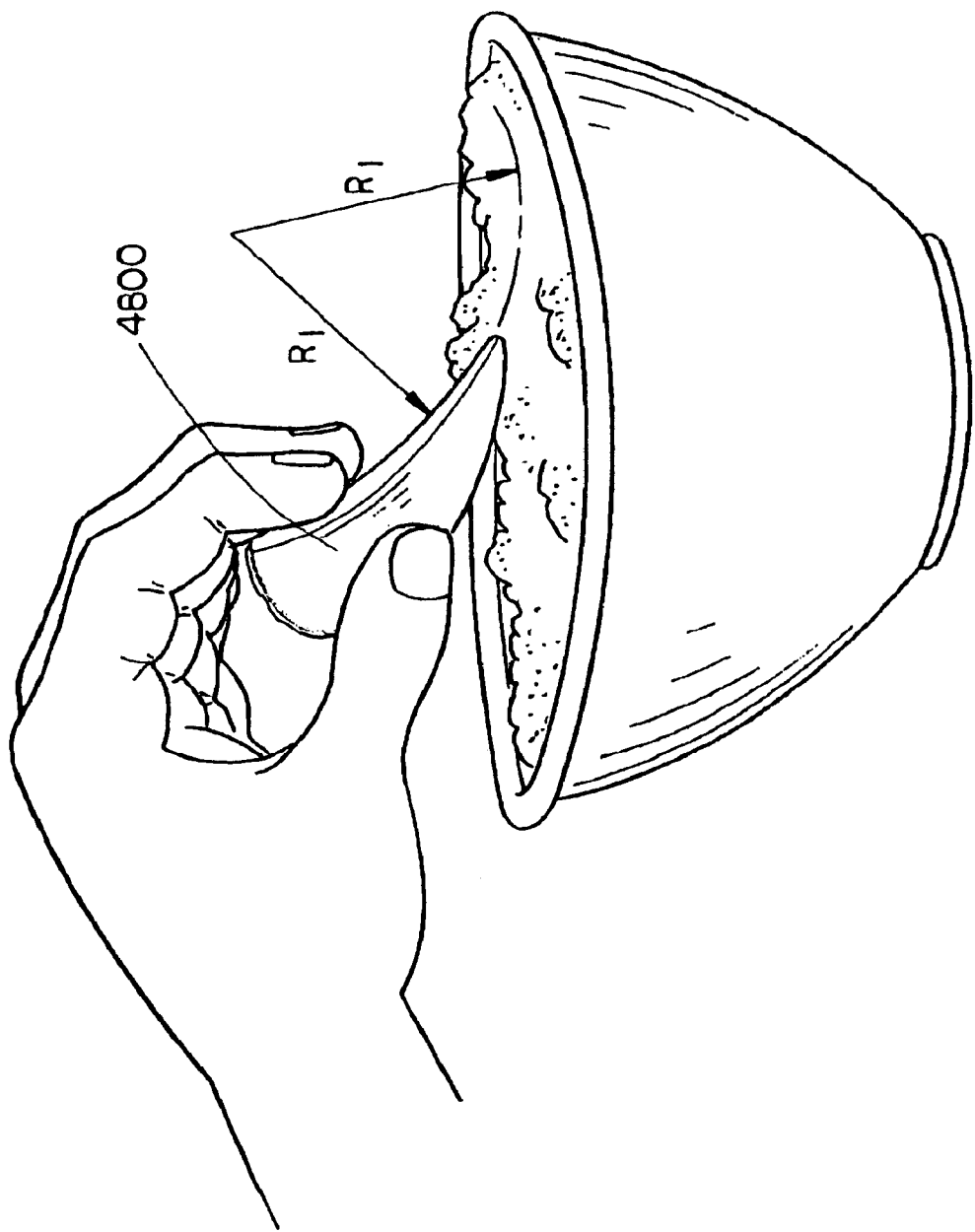
FIG. 60 illustrates a consumer using a food product as a garnish scoop, and that the scooping action used by the consumer has a radius substantially similar to the radius of the concave side of the food product. The consumer is grasping the thick end of the food product and using the thinner end as a scoop.
Figure 61:
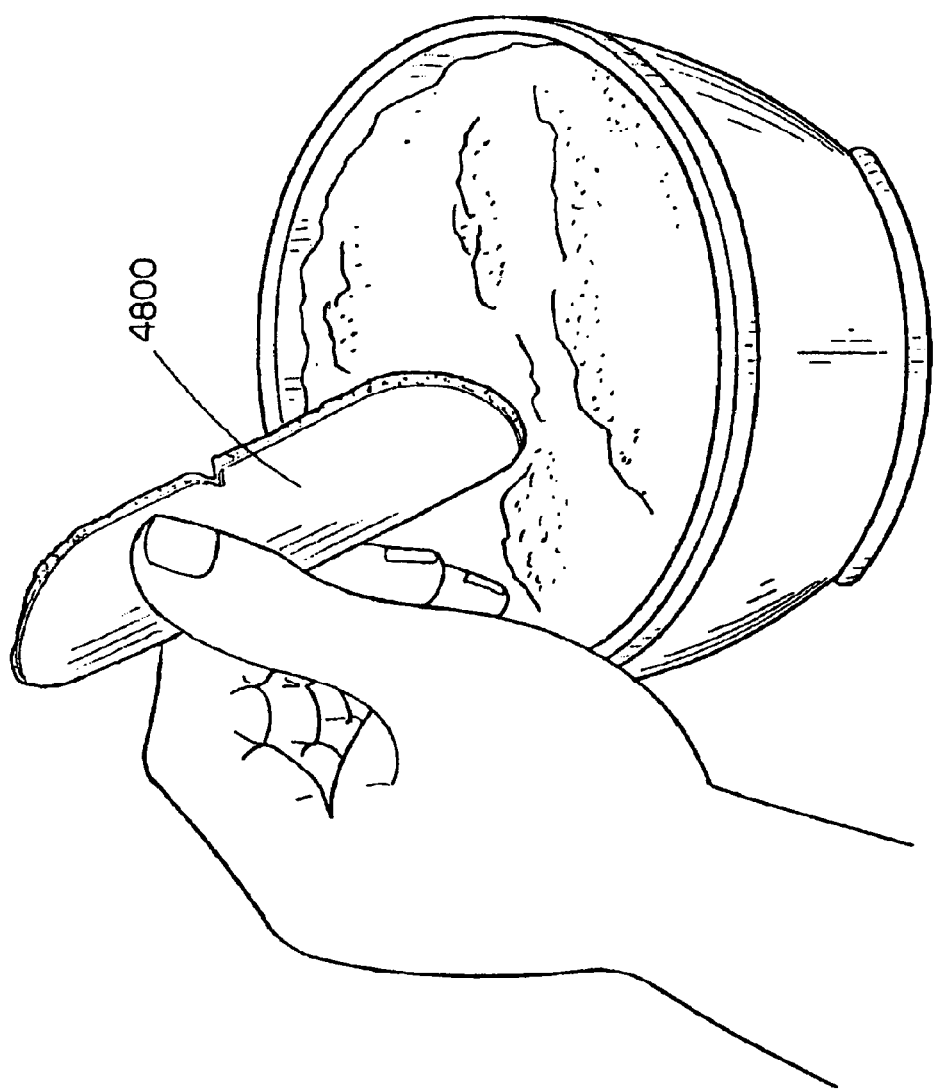
FIG. 61 illustrates a consumer using a food product as a garnish scoop. The food product is being dipped into a bowl of garnish and the concave surface of the food product is used to capture garnish.

FIG. 32 illustrates a blade configuration 3200 for a cutter assembly 10 including a housing member 12 and a plurality of curvilinear blades 14. The plurality of curvilinear blades 14 illustrated in FIG. 32 may be configured to radiate from a point along the housing member 12. The configuration of blades illustrated in FIG. 32 may produce segments of a food product that have a texture variance. The texture variance may provide a thin crispy edge cut and a thick mealy edge. The thin crispy edge may be ideally suited for scooping garnish while the thick mealy edge may be suited for grasping by a consumer as illustrated in FIGS. 60 and 61.

Figure 33:
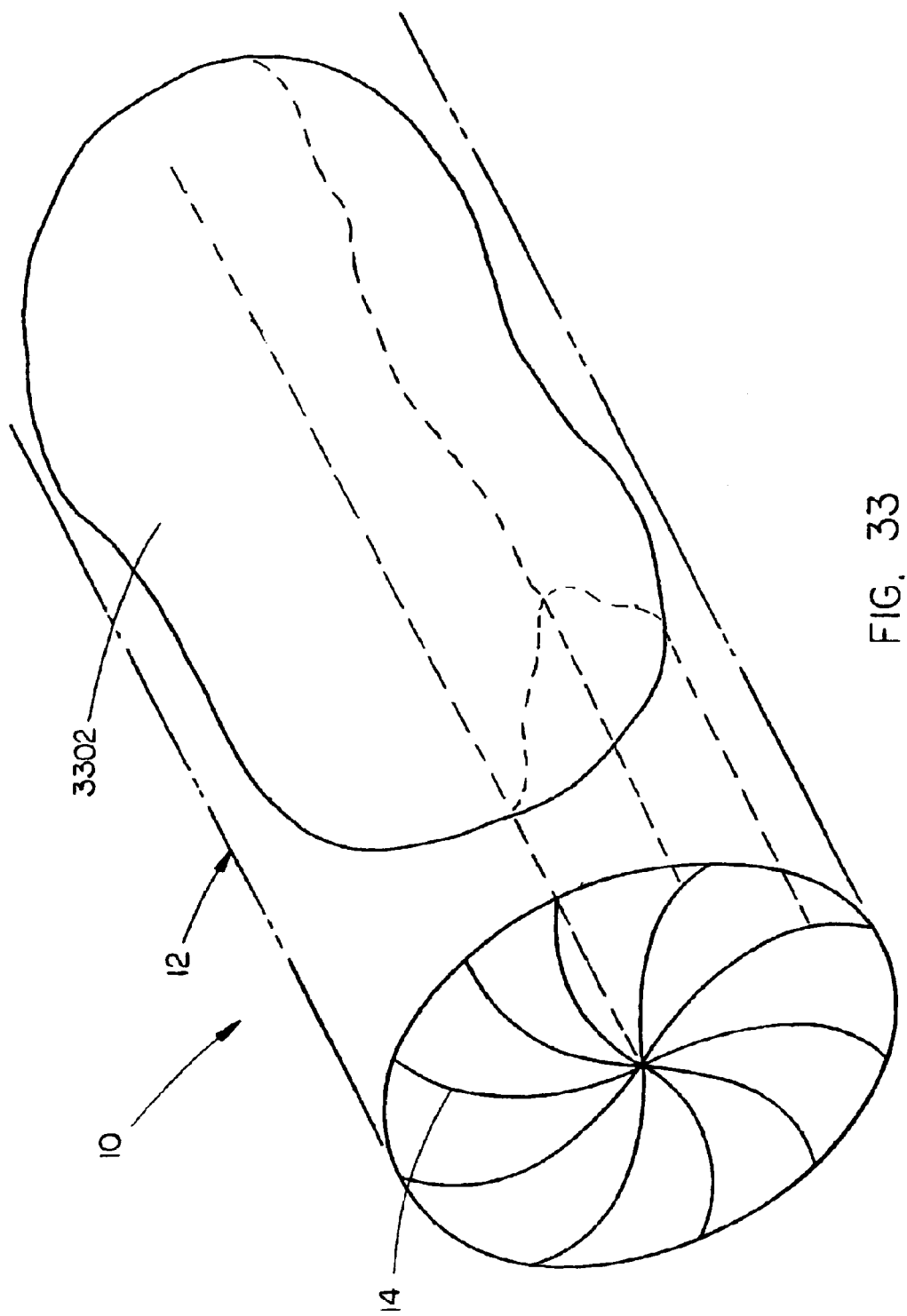
FIG. 33 is an isometric view illustrating a potato being presented to the specific configuration of curvilinear blades illustrated in FIG. 29.

FIG. 33 illustrates a foodstuff 3302 inside a housing member 12 being presented to a plurality of curvilinear blades 14. The foodstuff 3302 may be presented coaxially to a plurality of curvilinear blades 14, with the axis being defined by the centers of the curvilinear blades 14. Configuring the plurality of curvilinear blades 14 in substantially the same plane may reduce the overall size of the cutter assembly 10. In an alternative embodiment, the curvilinear blades 14 may be configured with each blade in a unique plane. Configuring the plurality of curvilinear blades 14 in separate planes may reduce compression of the foodstuff 3302.

Figure 34:
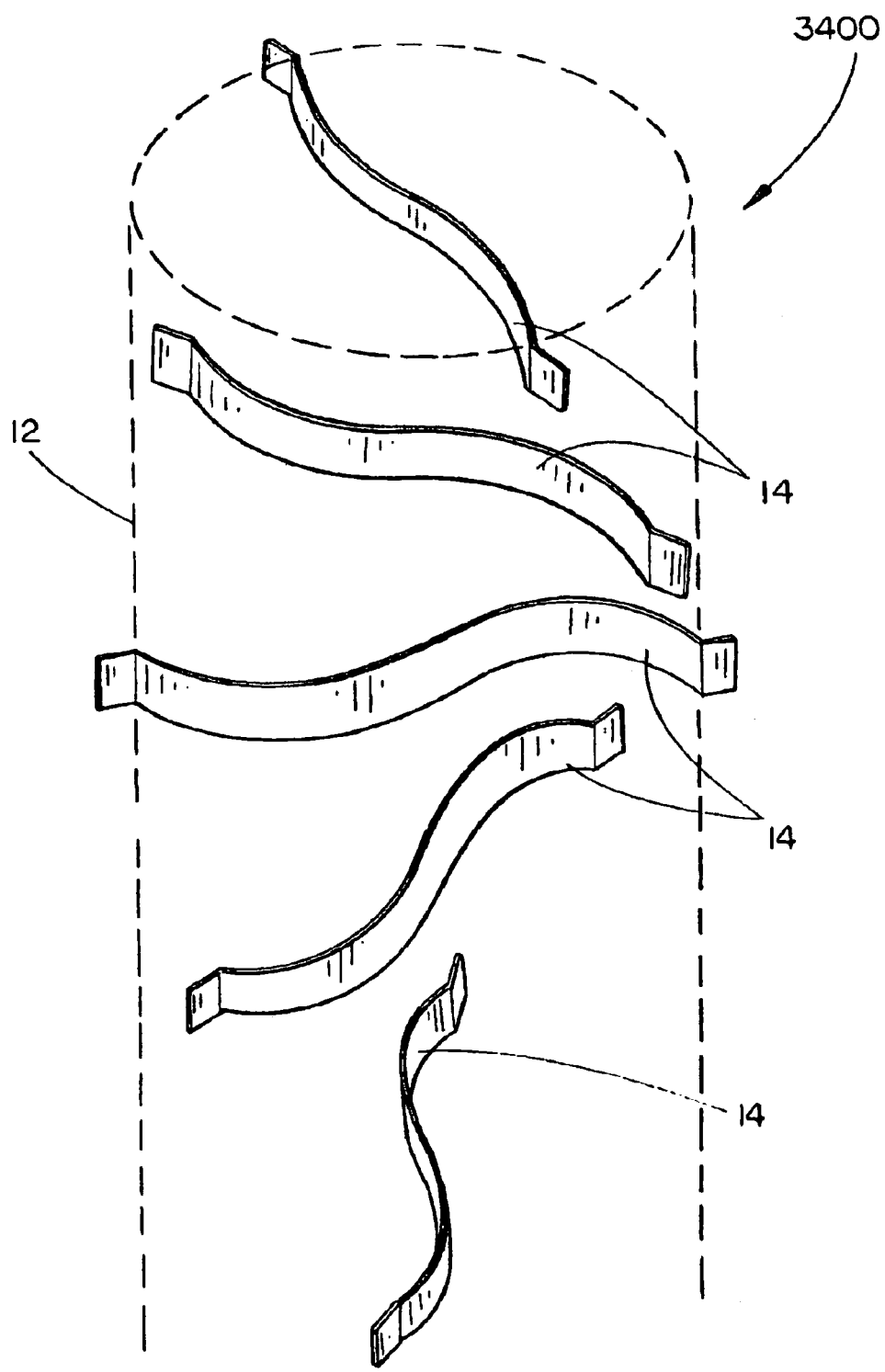
FIG. 34 is an exploded isometric view of the specific configuration of curvilinear blades illustrated in FIG. 29.

FIG. 34 illustrates a blade configuration 3400 for a cutter assembly 10 including a housing member 12 and a plurality of curvilinear blades 14. The curvilinear blades 14 may be configured in separate planes for reducing the force required to cut the foodstuff 3302. The side view of blade configuration 3400 corresponds to top view 2900 depicted in FIG. 29. Blade configuration 3400 illustrated in FIG. 34 and may result in a food product shaped substantially similar to food product 4800 depicted in FIG. 48.

Figure 35:
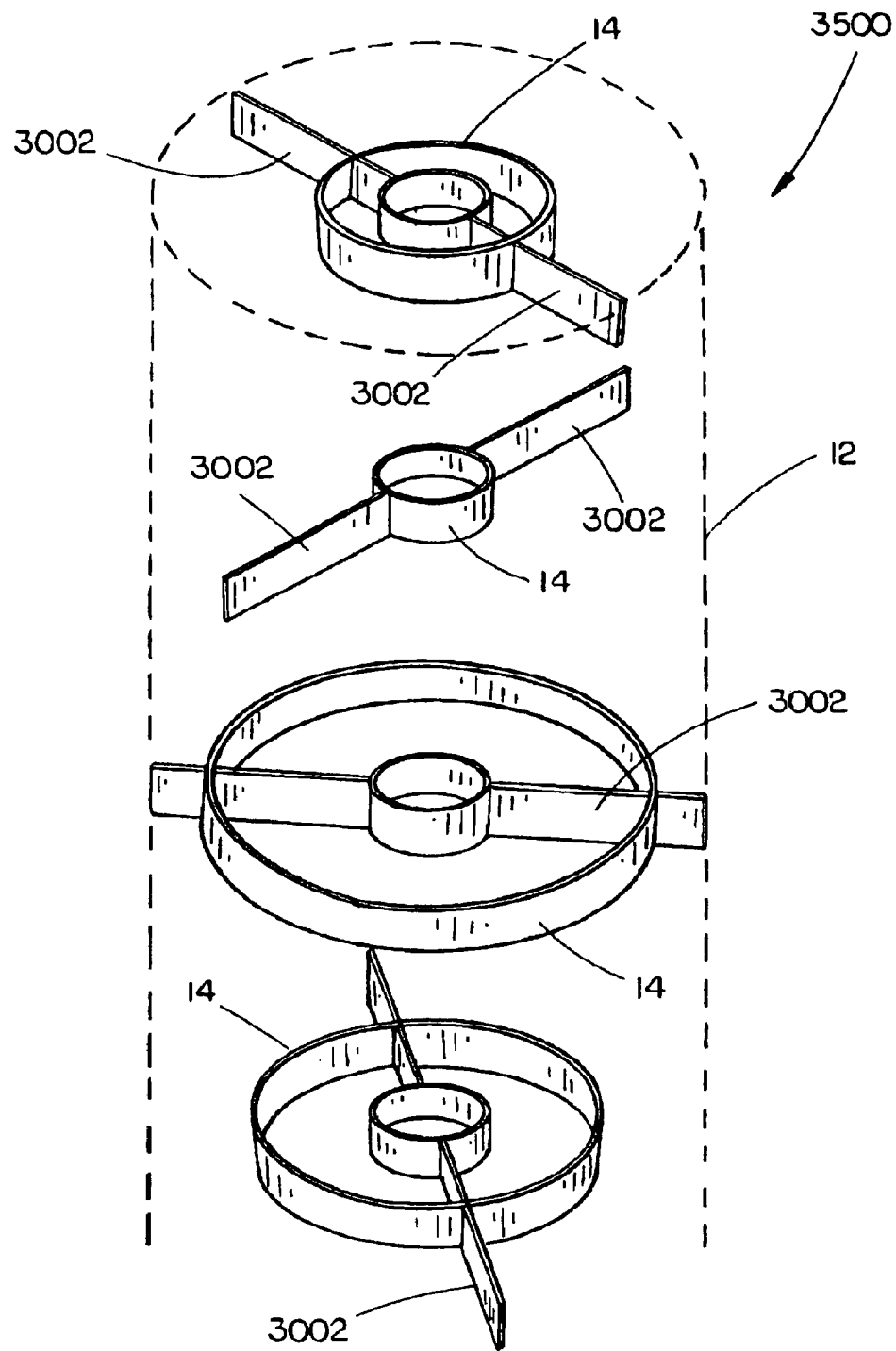
FIG. 35 is an exploded isometric view of the specific configuration of curvilinear blades and spoke blades illustrated in FIG. 30.

FIG. 35 illustrates a blade configuration 3500 for a cutter assembly including a housing member 12, a plurality of curvilinear blades 14, and a plurality of spoke blades 3002. The curvilinear blades 14 may be configured in separate horizontal planes for reducing the compression of foodstuff 3302. The blade configuration 3500 illustrates spoke blades 3002 in a distinct plane with no curvilinear blades 14. Alternatively, the spoke blades may be configured in the same plane as a curvilinear blade 14. The side view of blade configuration 3500 corresponds to top view 3000 depicted in FIG. 30. The curvilinear blade configuration depicted in FIG. 35 may yield a food product shaped substantially similar to food product 4900 depicted in FIG. 49.

Figure 36:
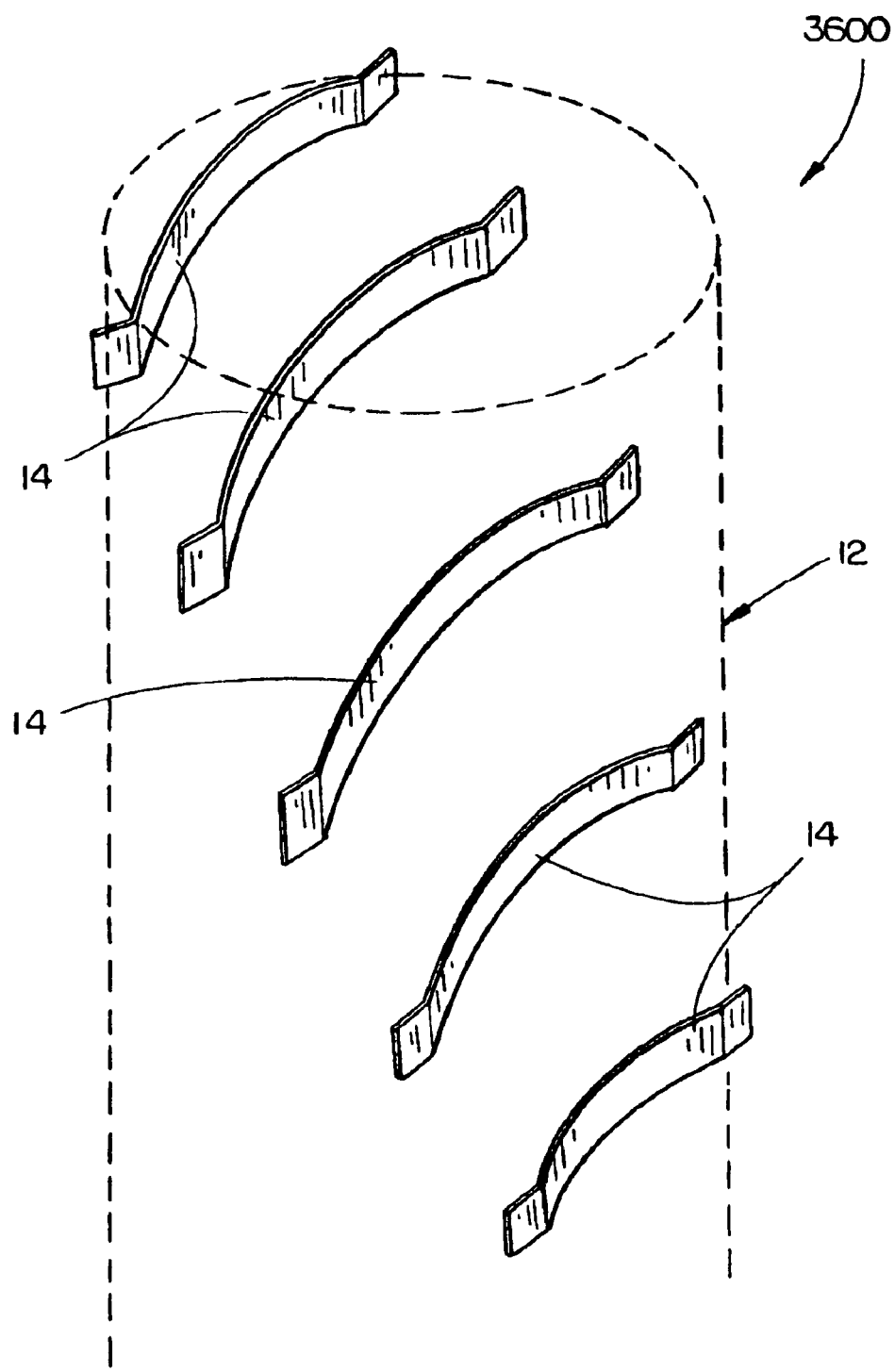
FIG. 36 is an exploded isometric view of the specific configuration of curvilinear blades illustrated in FIG. 31.

FIG. 36 illustrates a blade configuration 3600 for a cutter assembly, including a housing member 12 and a plurality of curvilinear blades 14. The curvilinear blades 14 may be configured in separate and distinct horizontal and vertical planes. The plurality of curvilinear blades 14, being configured in separate and distinct planes, may reduce compression when the foodstuff 3302 is presented to the curvilinear blades 14. The side view of the blade configuration 3600 corresponds to top view 3100 depicted in FIG. 31. The curvilinear blade configuration depicted in FIG. 36 may yield a food product shaped substantially similar to food product 5000 depicted in FIG. 50.

Figure 37:
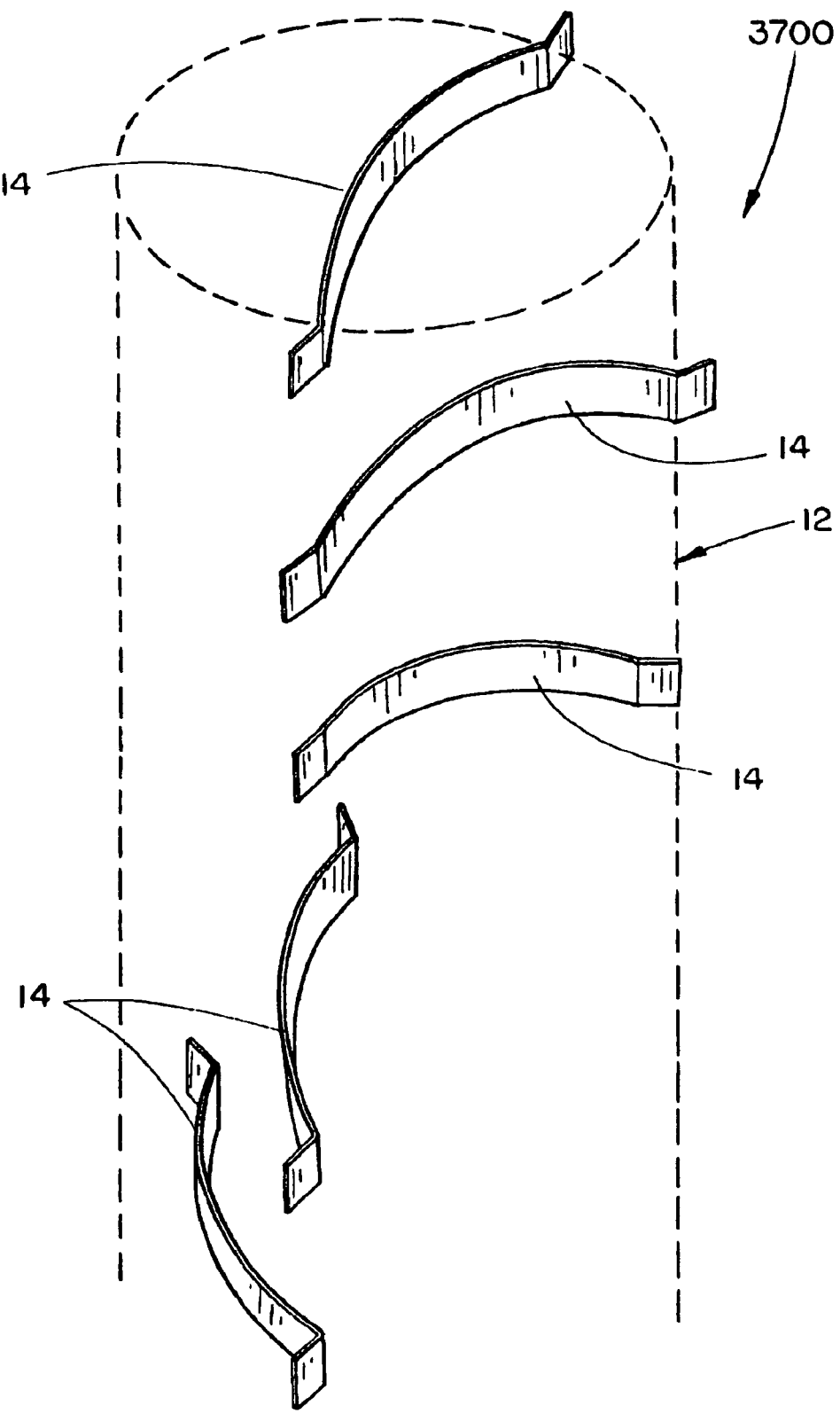
FIG. 37 is an exploded isometric view of the specific configuration of curvilinear blades illustrated in FIG. 32.

FIG. 37 illustrates a blade configuration 3700 for a cutting assembly 10 including a housing member 12 and a plurality of curvilinear blades 14. Configuring the curvilinear blades 14 in separate and distinct horizontal and vertical planes may reduce compression when the foodstuff 3302 is presented to the curvilinear blades 14. The blade configuration depicted in FIG. 37 may yield a food product shaped substantially similar to food product 5100 depicted in FIG. 51.

Figure 38:
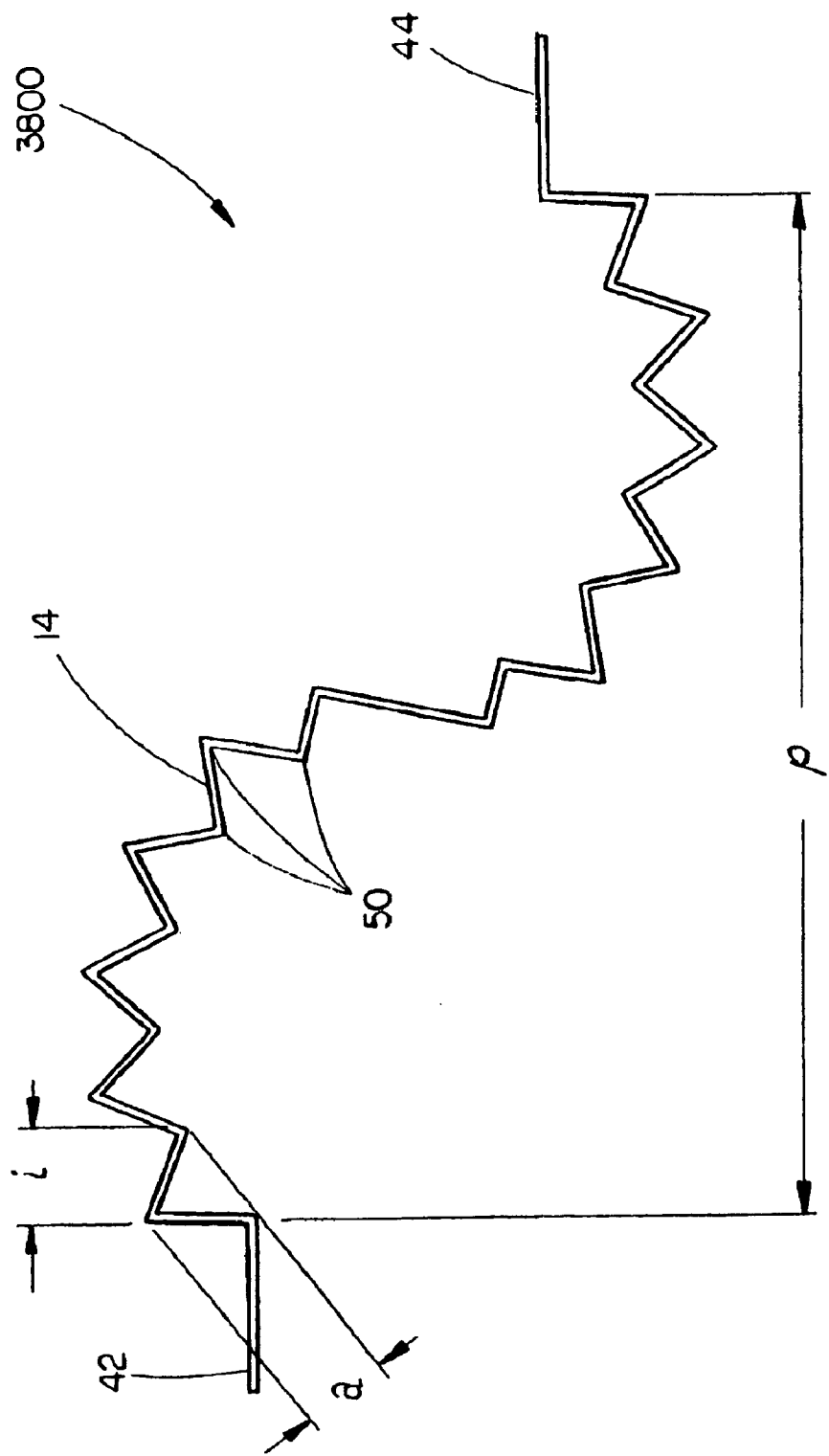
FIG. 38 is a plan view of a curvilinear blade including ridges in accordance with an exemplary embodiment of the present invention, wherein the ridges of the curvilinear blade have an amplitude and a frequency, and 'a' represents the amplitude of the ridges, 'p' represents the length of the cutting surface, and 'i' represents one-half of a wavelength.

FIG. 38 illustrates a top view of a curvilinear blade with ridges 3800 including an attachment means 60, 62, a knife edge 40, and a plurality of ridges 50. The curvilinear blade with ridges 3800 may be used to produce a concave tapered food product with ridges 5200, 5300, 5400 and 5500. FIG. 38 illustrates the amplitude of the ridges a, the length of the knife edge p, and the number of cycles i on the curvilinear blade with ridges 3800. The frequency of ridges found on a ridged cutting surface may be calculated by i/p. The blade illustrated in FIG. 38 has a frequency of 10 ridges along the length of the cutting surface. In alternative embodiments, the frequency of ridges may range from about 4 ridges per inch of knife edge to about 16 ridges per inch of knife edge.

Figure 39:
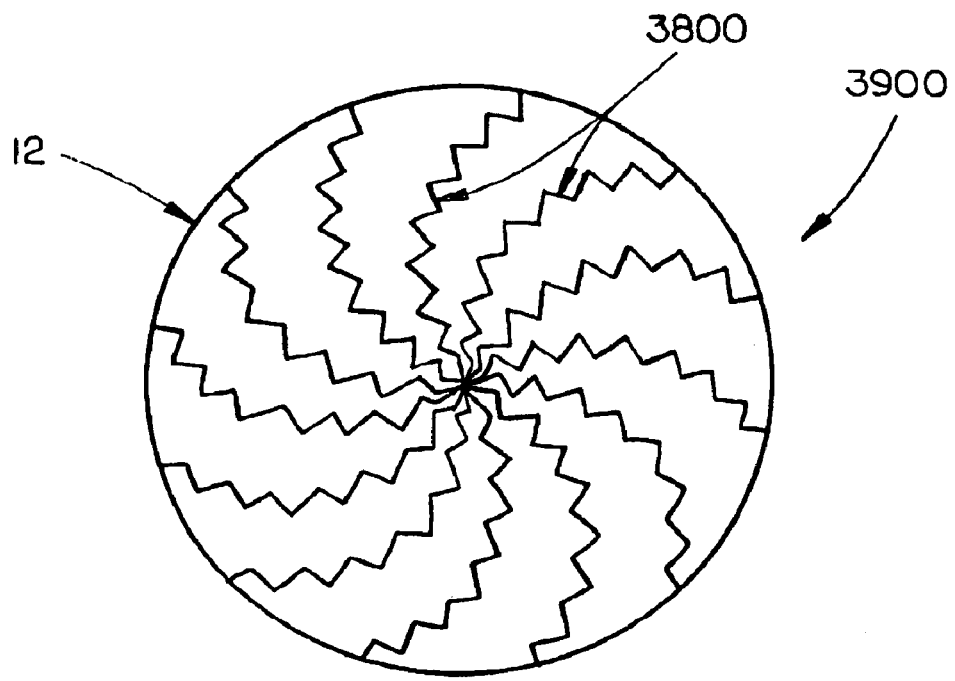
FIG. 39 is a plan view illustrating a plurality of curvilinear blades with ridges in a specific configuration for producing a concave tapered food product in accordance with an exemplary embodiment of the present invention, wherein the plurality of curvilinear blades with ridges are retained in a housing member.

FIG. 39 is a top view of a blade configuration 3900 for a cutter assembly 10 including a housing member 12 and a plurality of curvilinear blades with ridges 3800. FIG. 39 illustrates a configuration for a plurality of s-shaped curvilinear blades with ridges 3800. The s-shaped curvilinear blades with ridges 3800 may be defined by a sigmoid curve. The configuration for the plurality of curvilinear blades with ridges, illustrated in FIG. 39, may yield about twelve substantially similarly shaped food products. FIG. 39 illustrates a configuration of six curvilinear blades with ridges 3800. Alternatively, the number of curvilinear blades with ridges 3800 in a cutter assembly 10 may range from one blade to about sixteen blades. The configuration of curvilinear blades with ridges 3800 depicted in FIG. 39 may yield a food product shaped substantially similar to food product 5200.

Figure 40:
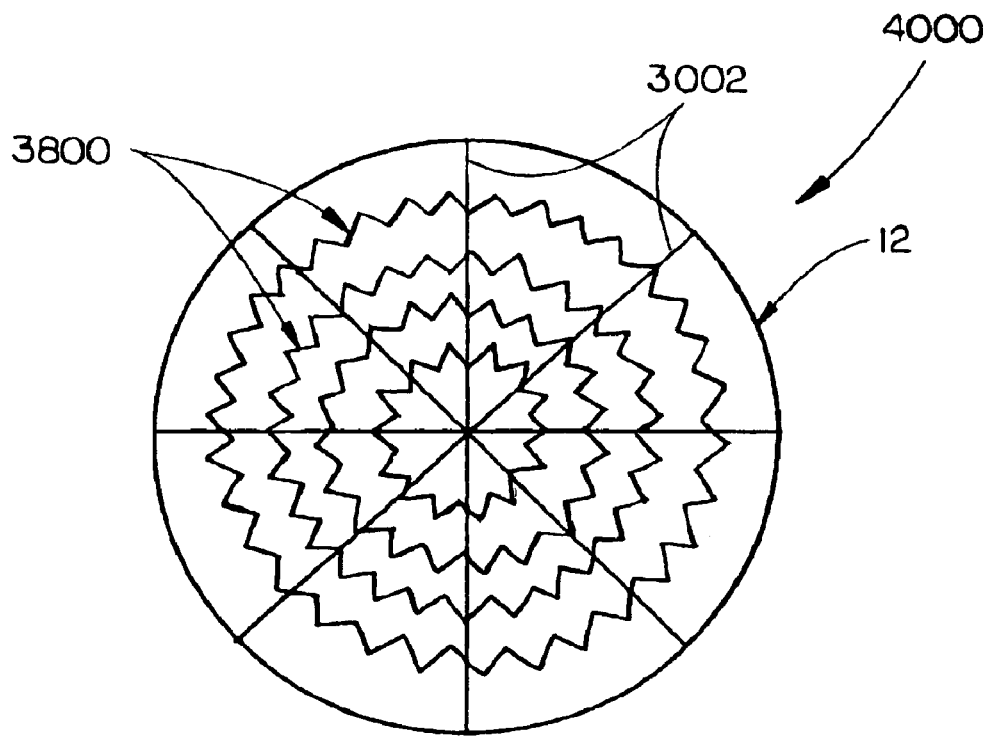
FIG. 40 is a plan view illustrating a plurality of curvilinear blades with ridges and spoke blades in a specific configuration for producing a concave tapered food product in accordance with an exemplary embodiment of the present invention, wherein the plurality of curvilinear blades with ridges are retained in a housing member.

FIG. 40 illustrates a top view of a blade configuration 4000 for a cutter assembly 10 including the housing member 12, a plurality of curvilinear blades with ridges 3800, and a plurality of spoke blades 3002. The spoke blades 3002 may be used to cut the foodstuff into cross sections. The spoke blade 3002 may be straight, as illustrated in FIG. 40, or the spoke blade 3002 may be curvilinear in shape. The configuration of curvilinear blades illustrated in FIG. 30 may produce up to forty substantially similarly shaped food products from a single food stuff. The configuration of a plurality of curvilinear blades with ridges 3800 depicted in FIG. 40 may yield a food product shaped substantially similar to food product 5300.

Figure 41:
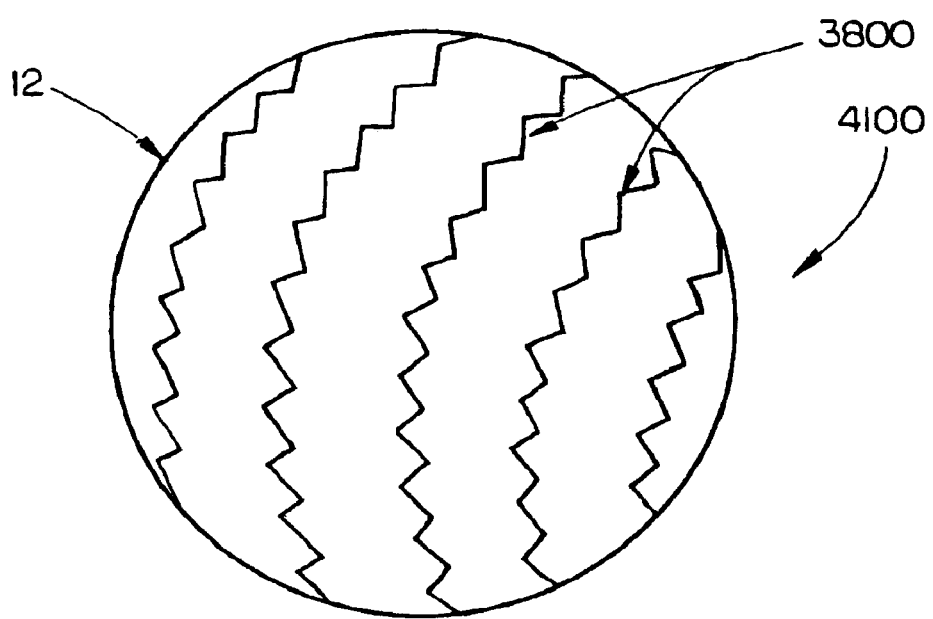
FIG. 41 is a plan view illustrating a plurality of curvilinear blades with ridges in another specific configuration for producing a concave tapered food product in accordance with an exemplary embodiment of the present invention, wherein the plurality of curvilinear blades with ridges are retained in a housing member.

FIG. 41 illustrates a top view of a blade configuration 4100 for a cutter assembly 10 including a housing member 12 and a plurality of curvilinear blades 3800. The configuration of the plurality of curvilinear blades with ridges 3800 illustrated in FIG. 41 is similar to a series of concentric arcs. The configuration of blades illustrated in FIG. 31 may provide segments of a food product that may vary in length, but the segments will have substantially similar curved sides, resulting in a food product which may be shaped substantially similar to food product 5400.

Figure 42:
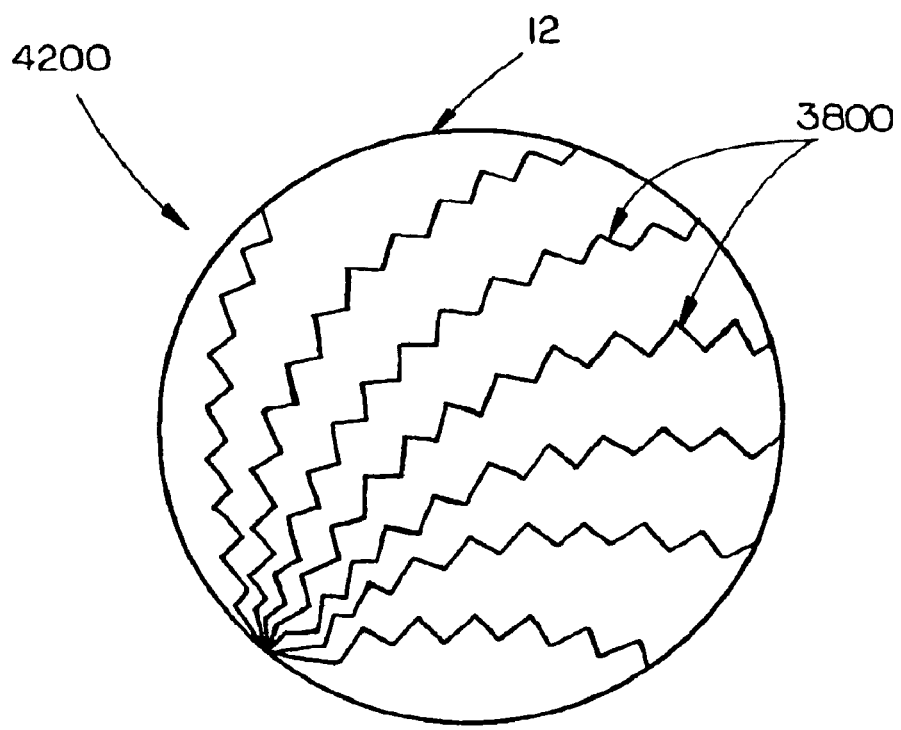
FIG. 42 is a plan view illustrating a plurality of curvilinear blades with ridges in a further specific configuration for producing a concave tapered food product in accordance with an exemplary embodiment of the present invention, wherein the plurality of curvilinear blades with ridges are retained in a housing member.

FIG. 42 illustrates a top view of a blade configuration 4200 for a cutter assembly 10 including a housing member 12 and a plurality of curvilinear blades with ridges 3800. The plurality of curvilinear blades with ridges 3800 illustrated in FIG. 42 are configured to radiate from a point along the housing member 12. The configuration of blades illustrated in FIG. 32 may produce segments of a food product that have a texture variance. The texture variance provides a thin crispy edge and a thick mealy edge. The thin crispy edge is ideally suited for scooping garnish while the thick mealy edge is suited for grasping by a consumer. The configuration of blades depicted in FIG. 42 may yield a food product shaped substantially similar to food product 5500.

Figure 43:
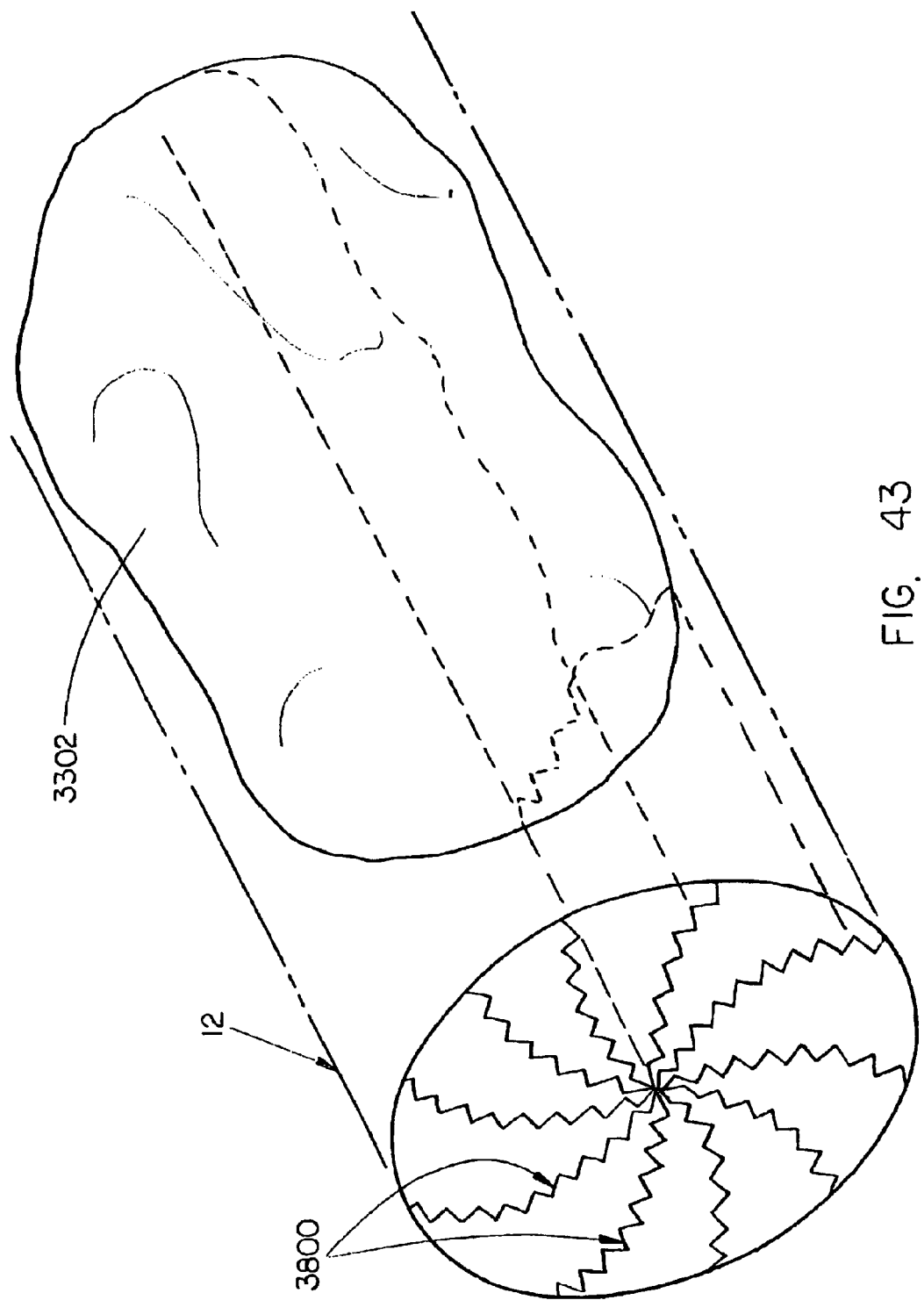
FIG. 43 is an isometric view illustrating a potato being presented to the specific configuration of curvilinear blades with ridges illustrated in FIG. 39.

FIG. 43 depicts a foodstuff 3302 inside a housing member 12 being presented to a plurality of curvilinear blades with ridges 3800. FIG. 43 further illustrates a foodstuff 3302 and the resulting cut that will be made on the foodstuff 3302 after having been presented to the plurality of blades with ridges 3800. The plurality of blades with ridges 3800 may be configured in one plane. In this configuration, the cutter assembly 10 would require a smaller amount of space, but greater force may be required to cut the foodstuff 3302 because of the compression of the foodstuff 3302 that may result if the curvilinear blades with ridges 3800 are configured in a single plane. In an alternative embodiment, the plurality of blades with ridges 3800 may be configured in separate planes. Configuring the curvilinear blades with ridges 3800 in separate planes may increase the size of the cutter assembly 10, but may reduce the force at which the foodstuff 3302 would need to be presented to the plurality of curvilinear blades with ridges 3800.

Figure 44:
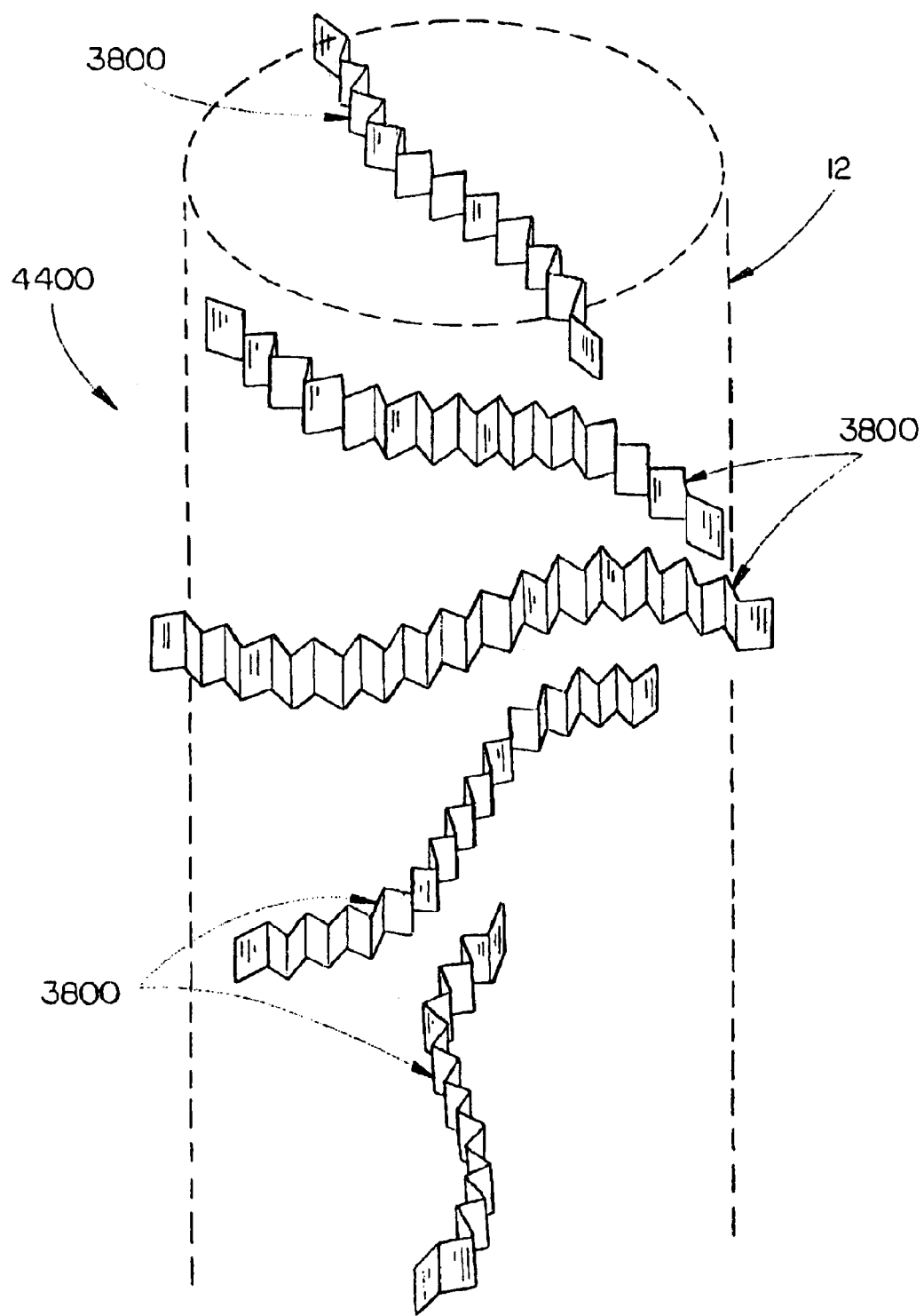
FIG. 44 is an exploded isometric view of the specific configuration of curvilinear blades with ridges illustrated in FIG. 39.

FIG. 44 is a blade configuration 4400 for a cutter assembly 10 including a housing member 12 and a plurality of curvilinear blades with ridges 3800. The plurality of curvilinear blades with ridges 3800 are configured in separate vertical planes and may the amount of force needed when presenting the foodstuff 3302 to the plurality of curvilinear blades with ridges 3800. Blade configuration 4400 corresponds to the top view of blade configuration 3900 and may yield a food product shaped substantially similar to food product 5200.

Figure 45:
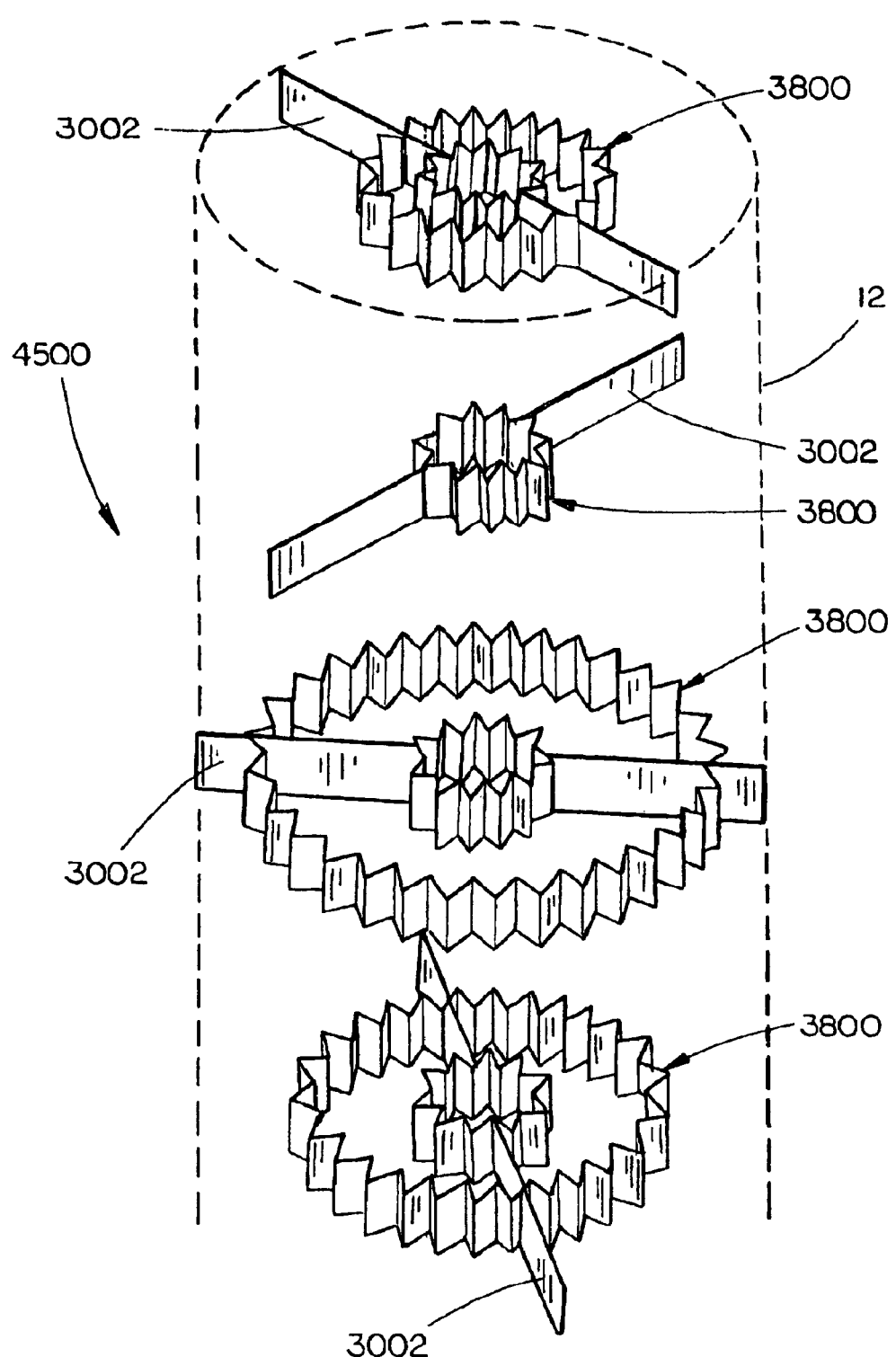
FIG. 45 is an exploded isometric view of the specific configuration of curvilinear blades with ridges and spoke blades illustrated in FIG. 40.

FIG. 45 is a blade configuration 4500 for a cutter assembly 10 including a housing member 12, a plurality of curvilinear blades with ridges 3800, and a plurality of spoke blades 3002. Blade configuration 4500 illustrates that the plurality of curvilinear blades with ridges 3800 may be in separate vertical planes and the radius of the curvilinear blades with ridges 3800 may vary. In an alternative embodiment, one plane may contain one or more spoke blades 3002 and no curvilinear blades with ridges 3800. Blade configuration 4500 corresponds to the top view of blade configuration 4000 and may yield a food product shaped substantially similar to food product 5300.

Figure 46:
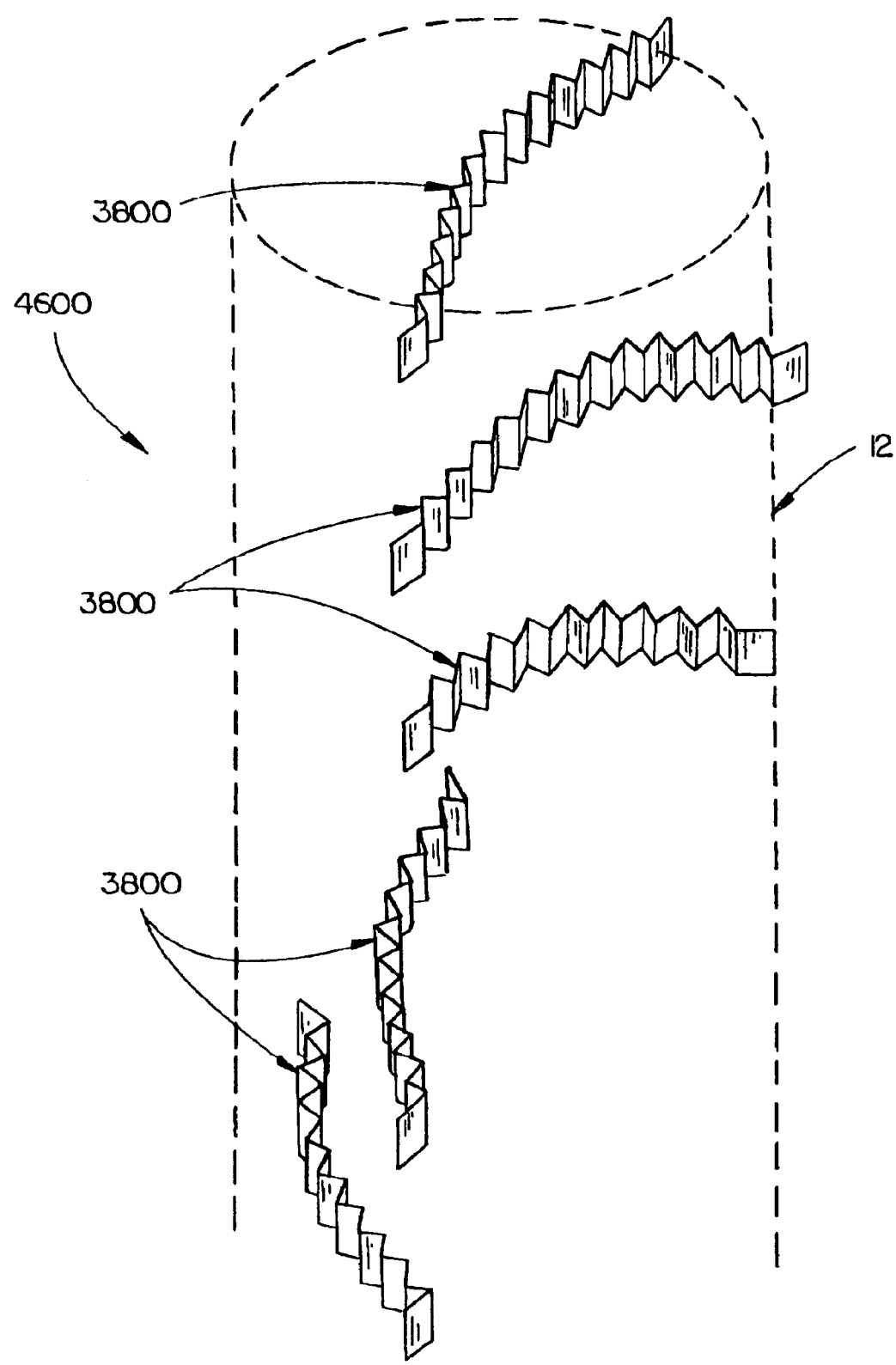
FIG. 46 is an exploded isometric view of the specific configuration of curvilinear blades with ridges illustrated in FIG. 41.

FIG. 46 is a blade configuration 4600 for a cutter assembly 10 including a housing member 12 and a plurality of curvilinear blades with ridges 3800. Blade configuration 4600 illustrates that the curvilinear blades with ridges may be configured in separate vertical planes. Blade configuration 4600 may result in a food product with texture variance resulting in a thin crispy end and a thick mealy end. Blade configuration 4600 corresponds to the top view of blade configuration 4100 and may yield a food product shaped substantially similar to food product 5500.

Figure 47:
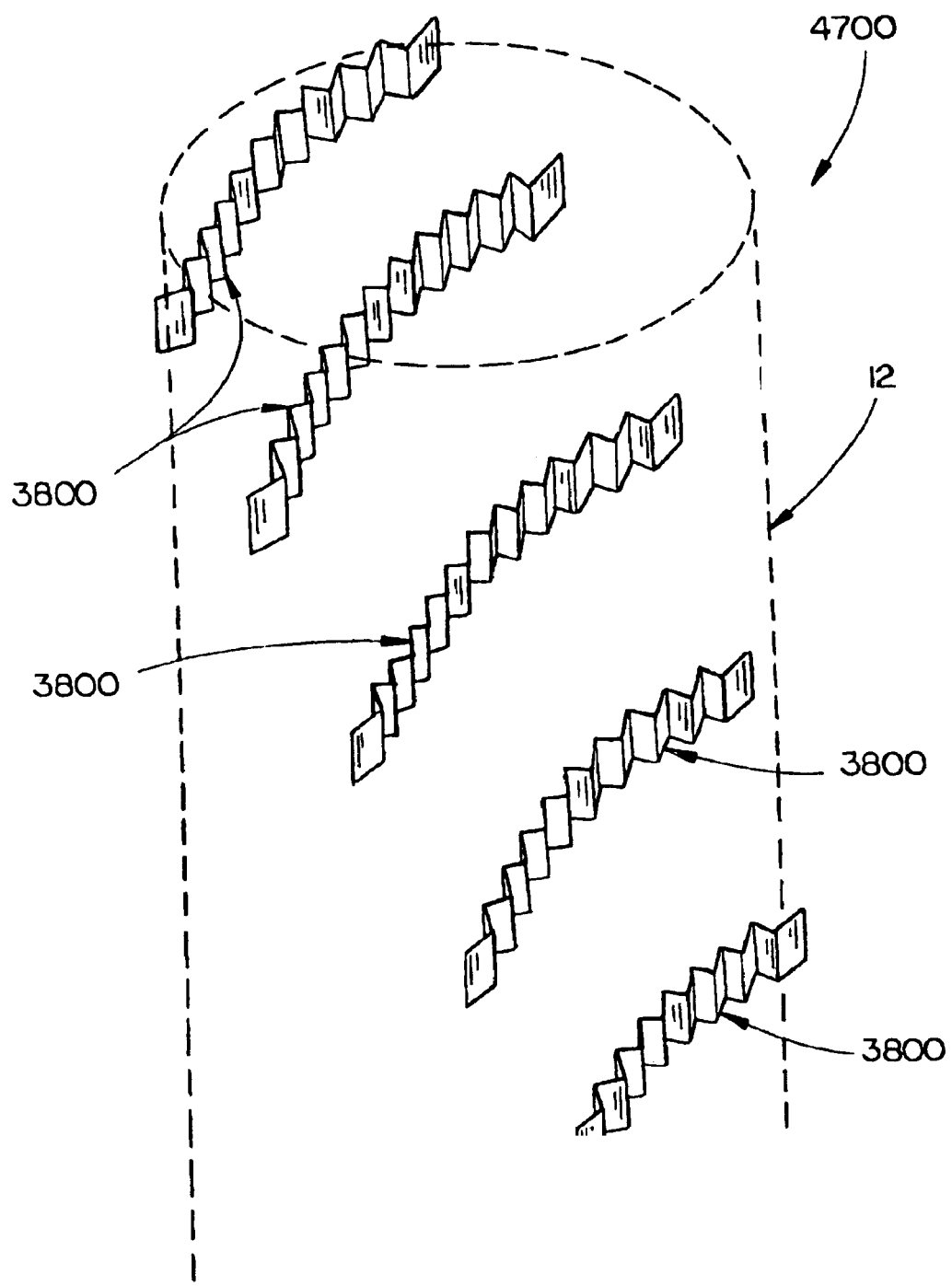
FIG. 47 is an exploded isometric view of the specific configuration of curvilinear blades with ridges illustrated in FIG. 42.

FIG. 47 is a blade configuration 4700 for a cutter assembly 10 including a housing member 12 and plurality of curvilinear blades with ridges 3800. Blade configuration 4700 illustrates that the plurality of curvilinear blades with ridges 3800 may be configured in separate horizontal planes and separate vertical planes. Blade configuration 4700 corresponds to the top view of blade configuration 4100 and may yield a food product shaped substantially similar to food product 5400.

Figure 62:
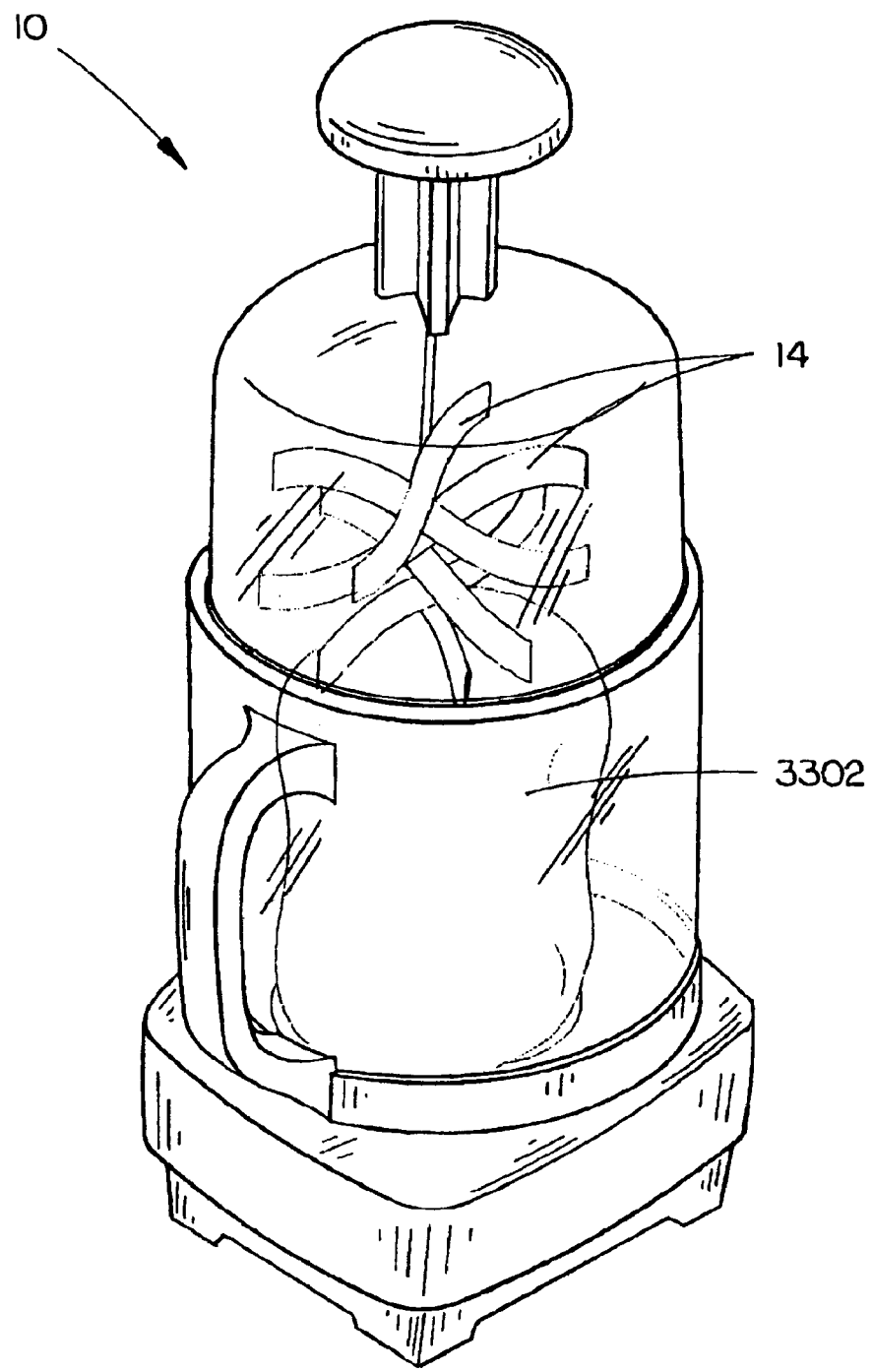
FIG. 62 illustrates a manually operated cutter assembly.

FIG. 62 illustrates a cutter assembly 10, including a plurality of curvilinear blades and a foodstuff 3302. FIG. 62 illustrates a cutter assembly 10 that can be operated manually using a plunger. In one embodiment, the plunger mechanism may press the curvilinear blades 14 into the foodstuff 3302, thereby cutting the foodstuff 3302. In a further embodiment, the plunger mechanism may press a foodstuff 3302 into a plurality of curvilinear blades 14, thereby cutting the foodstuff 3302. In additional embodiments, curvilinear blades with ridges 3800 may be used in the cutter assembly 10 illustrated in FIG. 62.

FIG. 48 is a concave tapered food product 4800 including a cross section 4802, a second end 4804, a first edge 4806, a second shaped edge 4808, a first side 4810, a second side 4812, and a third side 4814. A food product 4800, 4900, 5000, 5100, 5200, 5300, 5400, 5500 may include a foodstuff that has been cut or shaped to have a concave side. A shaped edge may include a food product with curvilinear edges formed from the curvilinear blade 14 or from at least a portion of the outside of the foodstuff. Food product 4800 may be configured with a first side 4810 that is generally concave for allowing the food product 4800 to hold an increased amount of garnish compared to a food product with no concavity. The second side 4812 may be generally convex giving the product a natural organic shape. The third side 4814 joins the first side 4810 and the second side 4812. The area of the food product where the first edge 4806 and the second edge 4808 are nearest to each other meet in a thin edge that upon cooking gives the edge a crispy texture. The area of the food product where the first edge 4806 and second edge 4808 are further apart may result in a thicker edge closer to the third edge 4814. Upon cooking the thick edge near the third edge 4814 may become soft and mealy. Food product 4800 may include a thin crispy edge and a thick mealy edge. Varying the thickness of the ends may provide a food product with texture variance. Texture variance results in a food product having a thin edge and a thick edge, upon cooking the thin edge may become crispy, while the thick edge may become soft and mealy. The thin crispy edge may be suited for scooping garnish while the thick mealy edge may be suited for grasping by a consumer, as illustrated in FIG. 60. Food product 4800 may be manufactured from blade configurations 2900 and 3400.

FIG. 49 illustrates a concave tapered food product 4900 including a cross section 4802, a second end 4804, a first edge 4806, a second edge 4808, a second face 4812, a third face 4814, and a fourth face 4816. The food product 4900 may also include a first face 4810 that is concave for holding an increased amount of garnish or topping. The food product 4900 may have small radii permitting the food product to be easily manipulated by children with small hands. The small radii of the food product 4900 may make it suitable for use as a finger food that may be served as an appetizer. The food product 4900 illustrated in FIG. 49 may be produced from blade configurations 3000 and 3500 illustrated in FIG. 30 and FIG. 35.

FIG. 50 illustrates a food product 5000 including a cross section 4802, a second end 4804, a first edge 4806, a second edge 4808, a first side 4810, a third face 4814, and a fourth face 4816. The first side 4810 may be concave for holding an increased amount of foodstuff relative to a food product with non-concave sides. The food product 5000, illustrated in FIG. 50, may have a consistent thickness. The consistent thickness of the food product 5000 provides an alternative to the texture variance of the food product 4800. Additionally, the consistent thickness of the food product 5000 may allow the food product to be efficiently stacked in a serving tray or in another aesthetically pleasing arrangement. The food product 5000 illustrated in FIG. 50 may be produced from the blade configuration 3100 and 3600 depicted in FIG. 31 and FIG. 36.

FIG. 51 illustrates a food product 5100 including a cross section 4802, a second end 4804, a first edge 4806, a second edge 4808, a first side 4810, and a third side 4814. The first side 4810 may be concave for holding an increased amount of foodstuff relative to a food product with non-concave sides. The food product 5100 illustrated in FIG. 51 may have a thick mealy end and a thin crispy end similar to the food product 4800 depicted in FIG. 48. FIG. 51 illustrates that thick end of the food product 5100 may not be entirely convex. The edge of the thick end of the food product 5100 may be formed from the outside edge of the foodstuff 3302. The edge of the thick end may be subject to undulations and an inconsistent surface if the foodstuff 3302 used for producing the food product 5100 had an inconsistent outer edge. The food product 5100 illustrated in FIG. 51 may be produced from the blade configurations 3200 and 3700, illustrated in FIG. 32 and FIG. 37.

FIGS. 52, 53, 54 and 55 depict embodiments of food products 5200, 5300, 5400, and 5500. Food products 5200, 5300, 5400, and 5500 include a ridged cross section 5202, a second ridged end 5204, a first ridged edge 5206, which may be concave, a second ridged edge 5208, which may be convex, a first ridged side 5210, which may be substantially concave, a second ridged side 5212 which may be substantially convex, a third ridged side 5214, and a fourth ridged side 5216. Food products 5200, 5300, 5400, and 5500 are substantially similar to food products 4800, 4900, 5000, and 5100, respectively, with the additional advantage of having ridges. A ridge may include undulations, corrugations, and the like. The ridges may be of any shape, including but not limited to curved or angular ridges. The ridges provide may provide food products 5200, 5300, 5400, and 5500 with texture variance. Additionally, the ridges may provide food products 5200, 5300, 5400, 5500 with increased strength compared to a non-ridged food product. The increased strength of the ridged food products 5200, 5300, 5400, 5500 may allow the food product to hold an increased amount of garnish without breaking or spilling. Additionally, the ridged food products 5200, 5300, 5400, and 5500 expose more surface area than a non-ridged food product allowing garnish to more completely cover the ridged food products 5200, 5300, 5400, and 5500. The ridges on the ridged food product 5200, 5300, 5400, and 5500 may assist in holding garnish on the food product and reduce spills of garnish compared to a food product with no ridges.

The convex and concave surface of the food product 4800, 4900 5000, 5100, 5200, 5300, 5400, and 5500 may be defined by the outer edge of the food product, or by the arc of a curvilinear blade 14, or curvilinear blade with ridges 3800 used to cut the foodstuff. The dimensions of the arcs defining the convex and concave face include, but are not limited, to an arc length ranging from approximately ½ of an inch to 3 inches and an arc radius ranging from approximately ½ of an inch to 3 inches. In one embodiment, the dimensions of the arcs defining the surfaces include, but are not limited, to an arc length of approximately 1½ inches, and an arc radius of approximately ½ to 1 inch. The food products 4800, 4900 5000, 5100, 5200, 5300, 5400, and 5500 may include, but is not limited to, a width ranging from 1 inch to 2 inches and a thickness ranging from approximately ⅛ of an inch to approximately ¾ of an inch. A concave tapered food product is shown in FIGS. 12 through 19 and 48 through 51.

In some aspects, the invention provides a concave, tapered food product 5100, 5200, 5300, 5400, and 5500 including a first ridged side 5210 and a second ridged side 5212. The ridges on the food product may have a frequency ranging from approximately 5 to 10 ridges per side and an amplitude ranging from approximately ⅛ of an inch to ⅜ of an inch. The concave, tapered food product with ridges 5200, 5300, 5400, and 5500 may also hold an increased amount of topping or garnish compared to a wedge having planar surfaces. The concave tapered food product with ridges 5200, 5300, 5400, and 5500 is shown in FIGS. 20 through 27 and FIGS. 52 through 55. The concave tapered food products 5200, 5300, 5400, and 5500 may be defined by arcs giving the product a natural shape that is visually pleasing and useful when preparing aesthetically pleasing food dishes.

Figure 56:
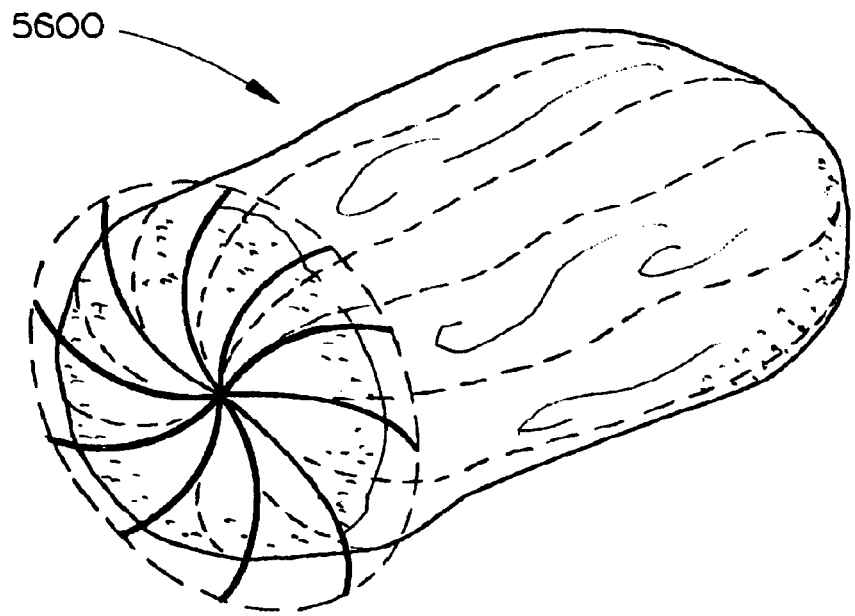
FIG. 56 is an isometric view illustrating a potato being presented to a specific configuration of curvilinear blades in accordance with an exemplary embodiment of the present invention.
Figure 58:
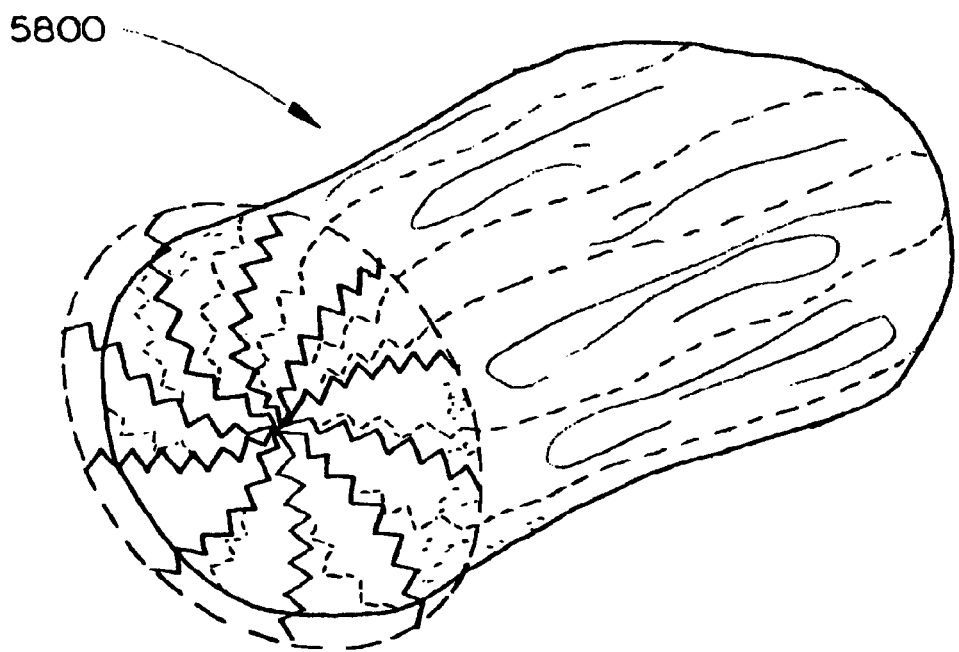
FIG. 58 is an isometric view illustrating a potato being presented to a specific configuration of curvilinear blades in accordance with an exemplary embodiment of the present invention, wherein stackable characteristics of the food product to create an aesthetically attractive design are shown.

FIGS. 56 and 58 illustrate where the cuts may be made on the foodstuff for forming food products substantially similar to food products 4800, 4900 5000, 5100, 5200, 5300, 5400, 5500.

Figure 57:
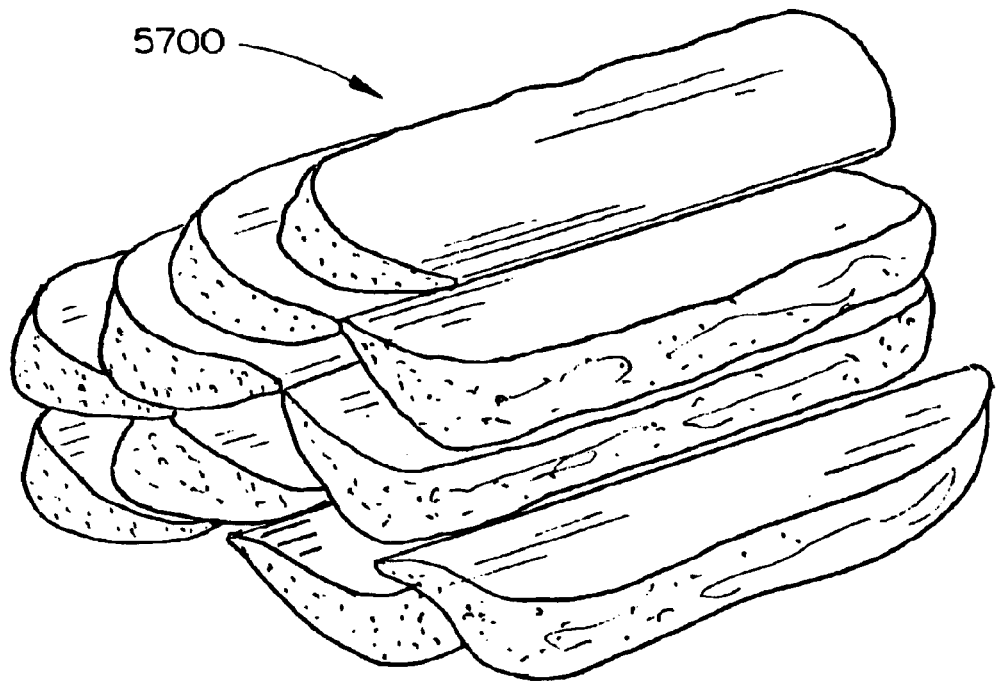
FIG. 57 is an isometric view of concave tapered food products produced by the cutting action of the curvilinear blades illustrated in FIG. 56.
Figure 59:
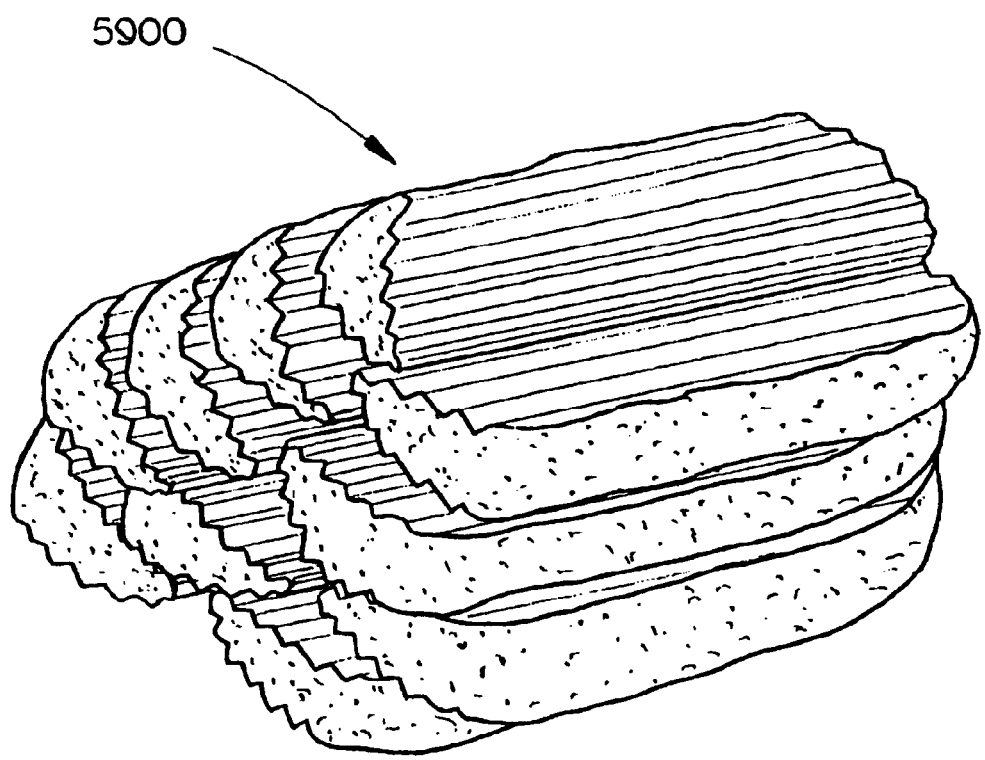
FIG. 59 is an isometric view of concave tapered food products produced by the cutting action of the curvilinear blades illustrated in FIG. 58, wherein stackable characteristics of the food product to create an aesthetically attractive design are shown.

FIGS. 57 and 59 illustrate the stackable qualities of the food products 4800, 4900 5000, 5100, 5200, 5300, 5400, and 5500, and the ability to use the food products 4800, 4900 5000, 5100, 5200, 5300, 5400, and 5500 for creating an aesthetically pleasing arrangement of food.

FIG. 60 illustrates a consumer scooping garnish with a food product 4800, where $R_1$ represents the radius in which the consumer angles the food product to scoop the garnish. $R_1$ is substantially equivalent to the radius of the concave surface of the food product. FIG. 60 further illustrates the consumer utilizing the thick end of the food product 4800, as a handle while the thin edge serves as a scoop for garnish. In alternative embodiments, food product 4900, 5000, 5100, 5200, 5300, 5400, 5500, may be used as depicted in FIG. 60.

FIG. 61 illustrates a consumer using a food product 4800, as a garnish scoop. FIG. 61 depicts a food product 4800 that having substantially parallel sides and a concave surface that for holding an increased amount of garnish compared to a food product with planar sides. In alternative embodiments, food product 4900, 5000, 5100, 5200, 5300, 5400, and 5500, may be used as depicted in FIG. 61.

Many fruits, vegetables and other foods may be suitable for utilization in the present invention. Suitable foodstuff for use in this invention may include: apples, bananas, carrots, cucumbers, guavas, kiwis, mangoes, melons, onions, papayas, peaches, pears, pineapples, potatoes, radishes, squash, strawberries, and tomatoes. Alternatively, foodstuff may be extruded and then processed by the present invention. The present invention may include using fresh unprocessed foodstuff or using foodstuff that is vacuum sealed, dehydrated, vacuum fried, or any other method known in the art for preserving foodstuff. Other foodstuff may be utilized without departing from the scope and spirit of the invention.

Thus, there has been shown and described an apparatus and a method for producing concave tapered food products. Additionally, a concave, tapered food product produced by the apparatus or the method has also been shown and described. Various changes may be made in the apparatus, method, or product of the invention without departing from the scope of the invention. It is intended that all matter contained in the above description and in the drawings shall be interpreted as illustrative and not in a limiting sense. Furthermore, while particular examples of using the cutting assembly involve cutting foodstuff, the cutting assembly may be used to process any type of food product or foodstuff, which are defined broadly to include any edible substance.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A cutter assembly for cutting a foodstuff to form a concave tapered food product, comprising:
   a base;
   a housing member having an open end and an end portion which is opposite to the open end and extends inward, the base being affixed to the housing member at the open end;
   a plurality of curvilinear blades each including a knife edge for cutting the foodstuff, the knife edge defining an arc along a first portion of the curvilinear blade, an attachment means at an end of the curvilinear blade for supporting the curvilinear blade; and
   a plurality of blade holding members stacked together, wherein the attachment means is positioned on each of the blade holding members to receive at least one curvilinear blade and wherein the blade holding members are disposed inside the housing member, the blade holding member retained in the housing member by the end portion of the housing member.

2. The cutter assembly for cutting a foodstuff to form a concave tapered food product, as claimed in claim 1, wherein at least one of the plurality of curvilinear blades forms a sigmoid curve.

3. The cutter assembly for cutting a foodstuff to form a concave tapered food product, as claimed in claim 1, further comprising:
   a ridge on the knife edge of at least one of the plurality of curvilinear blades,
   wherein the curvilinear blade having the knife edge with a ridge is configured for producing a concave tapered food product with ridges.

4. The cutter assembly for cutting a foodstuff to form a concave tapered food product, as claimed in claim 1, wherein curvilinear blade is configured to form a substantially uniformly shaped, concave tapered food product.

5. The cutter assembly for cutting a foodstuff to form a concave tapered food product, as claimed in claim 1, wherein the foodstuff is selected from the group consisting of: potatoes, sweet potatoes, and yams.

6. The cutter assembly for cutting a foodstuff to form a concave tapered food product, as claimed in claim 1, wherein the foodstuff is selected from the group consisting of: a fruit and a vegetable.

7. The cutter assembly for cutting a foodstuff to form a concave tapered food product, as claimed in claim 1, wherein the arc has a radius from about one-half of an inch to about three inches.

8. The cutter assembly for cutting a foodstuff to form a concave tapered food product, as claimed in claim 3, wherein the curvilinear blade has a frequency of ridges ranging from about four ridges per inch to about sixteen ridges per inch.

9. The cutter assembly for cutting a foodstuff to form a concave tapered food product, as claimed in claim 3, wherein the ridges on the curvilinear blade have an amplitude ranging from about one-sixteenth of an inch to about three-eighths of an inch.

10. The cutter assembly as claimed in claim 1, wherein the cutter assembly includes a number of curvilinear blades ranging from 2 through 36.

11. The cutter assembly as claimed in claim 1, wherein the cutter assembly includes four curvilinear blades, and wherein the blades are configured at suitable angles such that eight substantially uniformly shaped, concave, segments of foodstuff are produced in a single pass.

12. The cutter assembly as claimed in claim 1, further comprising:
    a spoke blade.

13. The cutter assembly for cutting a foodstuff to form a concave tapered food product, as claimed in claim 1, wherein the end portion of the housing member extends inward to form a lip, and wherein one of the blade holding members contacts the lip.

14. The cutter assembly for cutting a foodstuff to form a concave tapered food product, as claimed in claim 1, further comprising an end retainer member, wherein the end portion of the housing member extends inward to form a lip, and wherein one of the blade holding members contacts the end retainer member and the end retainer member contacts the lip.

* * * * *